(12) United States Patent
Jhas et al.

(10) Patent No.: US 12,314,929 B2
(45) Date of Patent: May 27, 2025

(54) SYSTEMS AND METHODS FOR FACILITATING MOBILE COMMERCE INTERACTIONS BETWEEN CUSTOMERS AND MERCHANTS

(71) Applicant: LUCOVA INC., Toronto (CA)

(72) Inventors: Amit Jhas, Toronto (CA); Abrar Siddiqui, Richmond Hill (CA); Lei Jiang, Toronto (CA); Vinh Dai Nguyen, Hamilton (CA); Martin Konecny, Toronto (CA)

(73) Assignee: LUCOVA INC., Toronto (CA)

( * ) Notice: Subject to any disclaimer, the term of this patent is extended or adjusted under 35 U.S.C. 154(b) by 483 days.

(21) Appl. No.: 17/004,221

(22) Filed: Aug. 27, 2020

(65) Prior Publication Data

US 2021/0081924 A1 Mar. 18, 2021

Related U.S. Application Data

(63) Continuation of application No. 15/022,884, filed as application No. PCT/CA2014/050907 on Sep. 19, 2014, now abandoned.

(Continued)

(51) Int. Cl.
*G06Q 20/32* (2012.01)
*G06Q 20/38* (2012.01)
(Continued)

(52) U.S. Cl.
CPC ....... *G06Q 20/3224* (2013.01); *G06Q 20/326* (2020.05); *G06Q 20/3278* (2013.01);
(Continued)

(58) Field of Classification Search
CPC .......... G06Q 20/3224; G06Q 20/3278; G06Q 30/02; G06Q 30/06; G06Q 30/0639; H04W 4/025; H04W 4/80
(Continued)

(56) References Cited

U.S. PATENT DOCUMENTS

2011/0224902 A1* 9/2011 Oi ................. G06F 16/2379
701/300
2011/0238476 A1* 9/2011 Carr ................ G06Q 30/0207
705/14.1

(Continued)

*Primary Examiner* — John W Hayes
*Assistant Examiner* — Wodajo Getachew
(74) *Attorney, Agent, or Firm* — Stephen Leonard Aird & McBurney LP

(57) ABSTRACT

Systems and methods are provided for facilitating mobile commerce interactions between a customer and a merchant, whereby a customer, having initiated a mobile commerce transaction via a mobile device, arrives at a merchant location to complete the transaction. In some embodiments, an intermediate remote server is employed to facilitate communication between a third party app running on a customer mobile computing device, and an app-agnostic merchant computing device residing at a merchant location. In some embodiments, the relative signal strength of a local wireless transceiver associated with a customer mobile computing device is employed to determine the proximity of a customer relative to a merchant at a merchant's premises. This proximity information may be employed to display, on the merchant computing device, a list of customers that is prioritized according to relative proximity.

21 Claims, 25 Drawing Sheets

Related U.S. Application Data

(60) Provisional application No. 61/880,561, filed on Sep. 20, 2013.

(51) Int. Cl.
*G06Q 30/0601* (2023.01)
*H04W 4/80* (2018.01)
*G06Q 30/02* (2023.01)
*G06Q 30/06* (2023.01)

(52) U.S. Cl.
CPC ............ *G06Q 20/386* (2020.05); *H04W 4/80* (2018.02); *G06Q 30/0639* (2013.01)

(58) Field of Classification Search
USPC .......................................................... 705/50
See application file for complete search history.

(56) References Cited

U.S. PATENT DOCUMENTS

| | | | |
|---|---|---|---|
| 2012/0144468 A1* | 6/2012 | Pratt | H04L 9/3271 726/7 |
| 2013/0030931 A1* | 1/2013 | Moshfeghi | H04B 5/73 705/16 |
| 2015/0031393 A1* | 1/2015 | Post | H04W 4/025 455/456.2 |
| 2017/0201858 A1* | 7/2017 | Li | G06Q 50/01 |

* cited by examiner

SYSTEMS AND METHODS FOR FACILITATING MOBILE COMMERCE INTERACTIONS BETWEEN CUSTOMERS AND MERCHANTS

CROSS-REFERENCE TO RELATED APPLICATION

This application claims priority to U.S. Provisional Application No. 61/880,651, titled "SYSTEMS AND METHODS FOR FACILITATING MOBILE COMMERCE INTERACTIONS BETWEEN CUSTOMERS AND MERCHANTS" and filed on Sep. 20, 2013, the entire contents of which is incorporated herein by reference.

BACKGROUND

The present disclosure relates to mobile commerce and mobile transactions.

With the pervasive usage of mobile devices, mobile software has become an essential element in society. Mobile applications (apps) continue to compete for user's time and attention in an attempt to provide context specific information in real-time or near-real-time. Mobile commerce (mcommerce) apps include those applications that facilitate the interactions between an app user and a brick-and-mortar merchant, irrespective of whether or not it is a purchase or transaction that is involved.

Mobile commerce apps may be created, for example, to help users identify products, discounts and deals. For retailers, mcommerce apps may manage customer loyalty and/or reward programs. For example, Fashion Kaleidoscope is an example of a mcommerce app that enables customers to shop for fashion products from a user-created catalog that is curated with street-style images. StyleKick, another mcommerce app, centers on providing users with custom fitting of clothing. Foodspotting helps users make dining decisions by sharing their taste experience, while OpenTable helps users make reservations at restaurants.

One goal of mobile commerce apps is to provide a mobile rich experience that begins on the user's phone (or other mobile device) and ends at the merchant's brick-and-mortar location. However, current technologies offer limited ability for application developers to complete the end-to-end experience. Central to this problem is the hardware and software at the merchant's brick-and-mortar location. Current point-of-sale systems offer limited integration while electronic payment systems, such as credit card terminals, offer limited features beyond their payment transaction portal.

There are a number of challenges to offering a scalable mobile commerce system that can manage the demands of multiple stakeholder integration while offering a secure and fast environment for real-time transactions. Some implementations have attempted to use cloud-based technology, where multiple devices interact with a central server or collection of servers, where information is stored, transformed and sent to devices anywhere in the world at or near real-time. The primary challenge in deploying such technologies for a mobile commerce environment relate to security.

Near Field Communication (NFC) technology offers highly secure forms for the transfer of payment credentials from a user phone to a merchant's payment terminal using electromagnetic wave signals that are transmitted and received over relatively short distances (e.g. <3 cm). However, the technology is limited in use as a mobile commerce platform. Currently, third party apps deployed on a user's phone are unable to access the NFC hardware to collect or remit payment as needed. More importantly, current NFC implementations are restrictive, as a merchant is limited to only transaction activities with the user.

Barcodes and similar technologies offer a low-tech method for the exchange of secured credentials between the app on a user's phone and a merchant. These credentials are easily generated by third party apps and can be presented to a merchant when a user arrives at their location. However, the method provides an incomplete experience for the merchant who must process these codes individually and requires the merchant to have special hardware that can read barcodes on mobile phones. Groupon is an example of such an application where merchants are emailed a list of codes that must be cross-referenced when a user arrives at their location for redemption of their deal. This list is usually in paper form and must be managed accordingly. Inherent in this method is the lack of security as any application can generate fraudulent counterfeits and present to a merchant. The above application also limits additional merchant activities as discussed above.

A complete cloud based system that requires the merchant to recognize the user as a customer at their location attempting to complete a transaction has seen limited adoption. Square has leveraged this method and employs a tablet at the merchant location where current users arriving at their location are presented. The merchant must discriminate images of the user face (images that are provided by user when initiating the app) in order to complete the transaction. This method however is not portable to other context where there may be significant number of potential users at a merchant's location at the same time or where the merchant must process transactions in a high pressure, limited light environments (such as night clubs). These scenarios create potential security issues and limit the technology to low value transactions.

SUMMARY

Systems and methods are provided for facilitating mobile commerce interactions between a customer and a merchant, whereby a customer, having initiated a mobile commerce transaction via a mobile device, arrives at a merchant location to complete the transaction. In some embodiments, an intermediate remote server is employed to facilitate communication between a third party app on a customer mobile computing device, and an app-agnostic merchant computing device at a merchant location. In some embodiments, the relative signal strength of a local wireless transceiver of a customer mobile computing device is employed to determine the proximity of a customer relative to a merchant at a merchant's premises for providing increased transaction security and to display, on the merchant computing device, a list of customers that is prioritized according to proximity. In some embodiments, service-UUIDs are employed to track customer mobile computing devices and maintain tracking after a device-UUID is randomly changed.

According, in one aspect, there is provided a computer implemented method of identifying customers at or near a merchant location according to proximity, the method comprising the steps of:
  detecting, via a merchant computing device, the presence of customer mobile computing devices associated with customers arriving at or near the merchant location, based on local wireless signals broadcasted by the customer mobile computing devices;

connecting, via a local wireless connection, with the customer mobile computing devices and receiving, from each of two or more customer mobile computing devices, an authentication token, wherein each authentication token is associated with a different customer;

processing each authentication token to determine customer identity information associating a unique customer identity therewith, such that each customer is identifiable by the merchant computing device;

obtaining a relative signal strength associated with at least two of the customer mobile computing devices; and displaying a customer list comprising the customers for whom the relative signal strength was obtained, wherein the customer list is prioritized by the proximity between the customer mobile computing devices and the merchant computing device, based on the relative signal strength of the customer mobile computing devices.

In another aspect, there is provided a computer implemented method of identifying customers at or near a merchant location, the method comprising the steps of:

broadcasting, via a merchant computing device, to customer mobile computing devices arriving at or near the merchant location, local wireless signals identifying the merchant computing device, such that the customer mobile computing devices can detect the presence of the merchant computing device and communicate this information to a remote server;

receiving, from the remote server, customer identity information and relative signal strength information associated with each of two or more customer mobile computing devices, the two or more customer mobile computing devices having each detected the merchant computing device and communicated the detection of the merchant computing device and a relative signal strength associated with the merchant computing device to the remote server, wherein each authentication token is associated with a different customer; and displaying a customer list comprising the customers for whom the relative signal strength was obtained, wherein the displayed customer list is prioritized by the proximity between the customer mobile computing devices and the merchant computing device, based on the relative signal strength of the customer mobile computing devices.

In another aspect, there is provided a computer implemented method of tracking selected mobile computing devices via a local wireless protocol, the method comprising:

a) detecting, via a central computing device, local wireless signals broadcasted by a plurality of peripheral mobile computing devices;

b) determining, based on the local wireless signals, the device UUID associated with each peripheral mobile computing device;

c) connecting to each peripheral mobile computing device;

d) identifying peripheral mobile computing devices having a service UUID associated with a mobile application;

e) identifying, and recording, the device UUIDs of the peripheral mobile computing devices having a service UUID associated with the mobile application and also having a unique service characteristic;

f) monitoring the UUIDs of the devices and repeating steps c) to e) when a new device UUID is detected; and g) in the event that a peripheral mobile computing device is found to have a new device UUID, but is also found to have a service characteristic that is associated with a previously detected peripheral mobile computing device, associating the new device UUID with the previously detected peripheral mobile computing device;

such that the tracking of a given peripheral mobile computing device having a unique service characteristic is maintained when the device UUID associated with the given peripheral mobile computing device changes with time.

In another aspect, there is provided a computer implemented method of dynamically communicating a message from a mobile application running on a customer mobile computing device to a merchant computing device residing at a merchant location, wherein the customer mobile computing device is associated with a customer, and wherein the mobile application is configured to communicate with a remote third party server, and wherein a remote transaction server connected to the remote third party server and to the merchant computing device, the method comprising:

receiving, on the remote transaction server, a message provided by the remote third party server, and customer information identifying the customer from whom the message has been sent, the message having been initially sent from the mobile application to the remote third party server;

sending the message and the customer information to the merchant computing device, such that the message associated with the customer can be displayed to a merchant user;

receiving, on the remote transaction server, a response from the merchant computing device, and the customer information identify in the customer to whom the response is directed; and sending the response and the customer information to the remote third party server, such that the remote third party server can forward the response to the mobile application running on the customer mobile computing device.

In another aspect, there is provided a system for facilitating a mobile commerce interaction between a customer and a merchant, the customer having associated therewith a customer mobile computing device running a mobile third party application connected with a remote third party server, the system comprising:

a merchant computing device residing at a merchant location, a remote transaction server connected to the merchant computing device;

wherein merchant computing device comprises computer hardware configured to:

detect the presence of a customer mobile computing device associated with a customer arriving at or near the merchant location, based on local wireless signals broadcasted by the customer mobile computing device;

connect, via a local wireless connection, with the customer mobile computing device and receive, from the customer mobile computing device associated with a pending order, reservation, or pre-purchase, an authentication token associated with the identity of the customer;

process the authentication token to determine customer identity information associating a unique customer identity therewith, such that the customer is identifiable by the merchant computing device;
receive input from a merchant user selecting the customer for the completion of the transaction;
after the transaction has been completed by the merchant, send a confirmation message of the completion of the transaction to the customer mobile computing device via the local wireless connection;
wherein the remote transaction server comprises computer hardware configured to validate the authentication token and transmit a confirmation of successful authentication to the merchant computing device.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Figure 1A:
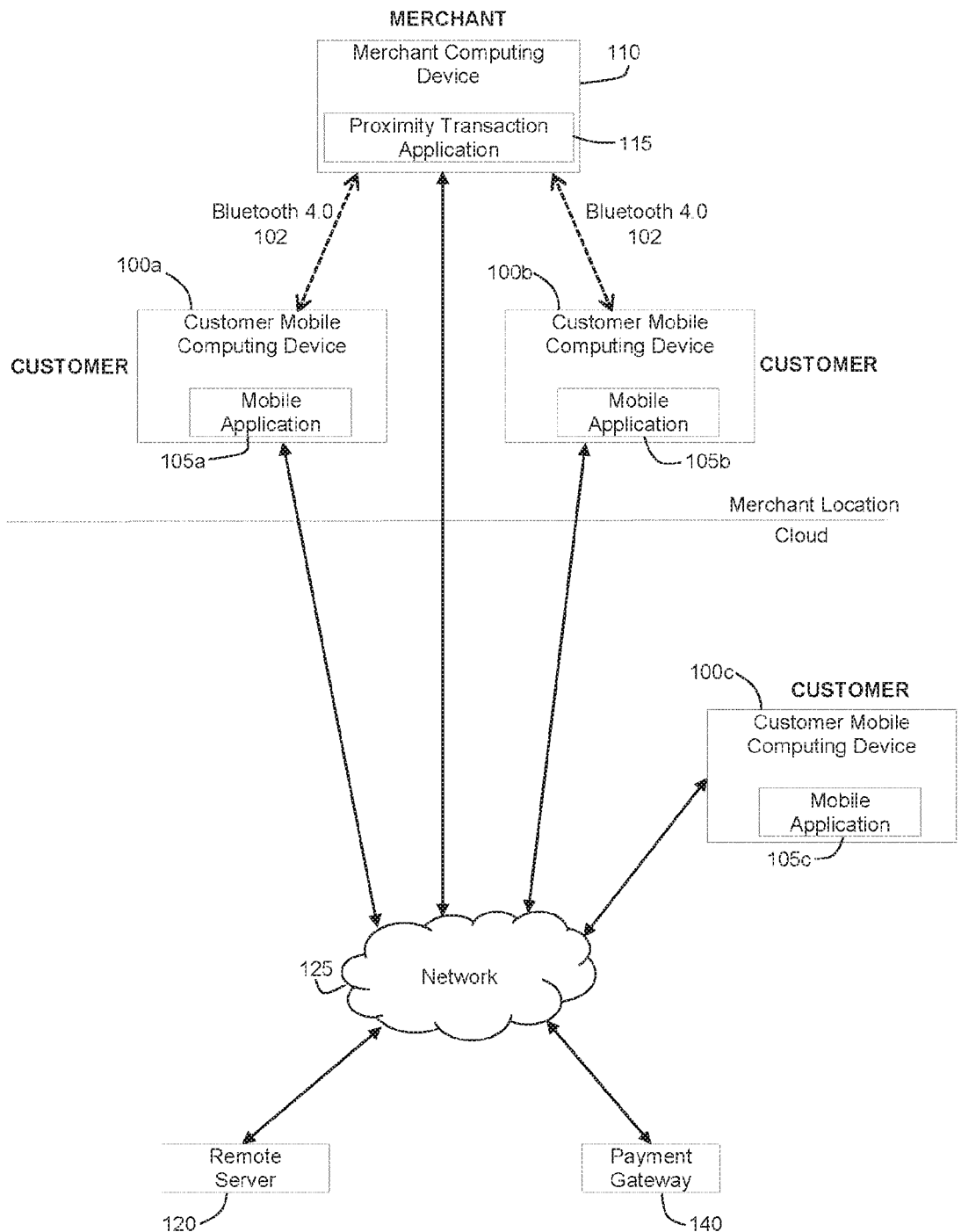
FIG. 1A is a block diagram illustrating an example mobile commerce system according to an example implementation.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the phrase "token" refers to electronic information that is passed from one computing device to another computing device for the purpose of security, identification and/or authentication. For example, in some example embodiments described herein, a security token may take the form of a sequence of characters generated by software running on a server when a user finishes the registration process, which may be used during subsequent interactions between a customer mobile computing device and a merchant computing device or back-end server. In another example, in some example embodiments described herein, an authentication token is a sequence of characters generated by software running on a server which may be used to identify the customer during interactions between a customer mobile computing device and a merchant computing device or back-end server, such as during later stages in the authentication process (for example, to prove that the customer is the one he or she claims to be, or to prove that the customer is the rightful owner of the product or service he or she has purchased). In another example, a confirmatory token may be provided to securely confirm, based on communication of the token from one computing device to another computing device, that a transaction has occurred. A token may be encrypted or unencrypted.

As used herein, the phrases "merchant premises" and "merchant location" refer to any location, associated with a merchant offering a product or service, where the product or service may be received, redeemed, picked-up, or otherwise obtained, such that the purchase or transaction may be completed. For example, according to some non-limiting examples, a merchant location may be a store or other retail establishment, restaurant, outlet, kiosk, hotel, salon, airport, and sports or fitness facility. In other embodiments, a merchant location may be a third-party location associated with a merchant, such as a third-party store, retail shipping facility, warehouse or distribution location.

As used herein, the phrase "proximity" refers to the relative distance between a customer mobile computing device and a merchant computing device at a merchant location.

As used herein, the phrase "peripheral device", when used within the context of the Bluetooth Low Energy protocol, relates to a device that broadcasts or advertises its presence. A peripheral device may be referred to as a "server" or "server device" according to the current nomenclature adopted under the Bluetooth standard.

As used herein, the phrase "central device", when used within the context of the Bluetooth Low Energy (BLE) protocol, relates to a device that listens for peripheral devices and initiates a connection with peripheral devices. A central device may be referred to as a "client" or "client device" according to the current nomenclature adopted under the Bluetooth standard.

As used herein, the phrase "local wireless connection" is a wireless connection between the devices that is established according to a local wireless protocol or standard facilitating communication between two devices, such as the Bluetooth standard, the Zigbee standard, one of the IEEE 802.11 standards, ISO/IEC 18092 standards, or the like. The distance over which communication is possible will depend on the protocol or standard selected. For example, communication among devices may be limited to, for example, no more than approximately 500 m, no more than approximately 100 m, no more than approximately 50 m, no more than approximately 25 m, no more than approximately 5 m, no more than approximately 1 m, or no more than approximately 20 cm.

Selected embodiments of the present disclosure provide systems and methods for facilitating mobile commerce transactions between a customer and a merchant, and for completing a mobile commerce transaction at a merchant location, based on local wireless communication and proximity detection. Some aspects of the present disclosure also address the security challenges of identifying mobile users at a merchant location. Aspects of the present disclosure also provide systems and methods for conducting safe and secure payment transactions (proximity transactions) for third-party app developers to employ in their application in order to complete the mobile experience for their user at an independent merchant's brick-and-mortar location. For merchants, aspects of the present disclosure provide a portal to access potential customers from a wide variety of third party mobile commerce applications (app agnostic functionality) without having to separately manage or integrate multiple end-to-end solutions at their venue.

FIG. 1A provides a block diagram of an example implementation of a proximity transaction system for facilitating a mobile commerce transaction between a customer and a merchant. This example system includes one or more customer mobile computing devices, 100a, 100b and 100c, each capable of running a mobile commerce program, application or "app" 105a, 105b, and 105c, respectfully. The example system also includes one or more remote servers 120, at least one merchant computing device 110 capable of running a proximity transaction program, application or "app" 115, and one or more computer hardware devices or systems for facilitating payment, such as payment gateway 140 (which may be configured to be behind remote server 120). Merchant computing device 115 may be a mobile or a fixed computing device.

Using such a system, a customer may order, reserve, or pre-purchase a product or service using a mobile commerce application (either prior to, or upon/after arriving, at the merchant premises), and subsequently complete the purchase and receive the product or service at a merchant location, where this latter step is facilitated using local wireless authentication based at least in part on the proximity between customer mobile computing device 100a-c and the merchant computing device 110.

In the present example system, the customer mobile computing devices and merchant computing device 110 are capable of local wireless communication when the customer mobile computing devices are within range of a local wireless network, as shown at 102 (using, in the present example, the Bluetooth 4.0 protocol, which is currently implemented on the iOS®5+ and Android® OS 4.3+ operating systems), such that when the customer arrives at the merchant location to perform a new mobile commerce transaction, or to complete a mobile commerce transaction and obtain a pre-ordered, reserved, or pre-purchased product or service, the customer mobile computing device may be detected and identified via a connection to merchant computing device 110 when it is sufficiently close (proximal) to merchant computing device 110 to facilitate a local wireless connection. In the example system diagram shown in FIG. 1A, customer mobile computing devices 100a and 100b are at or near a merchant location, such that local wireless connections 102 may be established with merchant mobile computing device 110, while customer mobile computing device 100c is not sufficiently close to facilitate such a connection (e.g. this customer is at home or at another location other than the merchant location).

As described in further detail below, in some example embodiments, local wireless communication between customer mobile computing device 100a (and devices 100b and 100c, when they are within a suitable distance range; the forthcoming discussion focuses customer mobile computing device 100a for simplicity and clarity) and merchant computing device 110 may then be employed to transmit an authentication token from customer mobile computing device 100a to merchant computing device 110, in order to provide proximity-based authentication of the customer to the merchant to facilitate a secure transaction. The authentication, based on the transmitted authentication token, may be performed locally at the merchant premises or remotely. Such authentication methods provide security and convenient, automated authentication of the customer.

In some example embodiments, the authentication of the customer and overall security of the transaction are further enhanced by the determination of the relative proximity between customer mobile computing device 100a and merchant computing device 110, such that the mobile transaction may be completed by the merchant once the merchant can confirm that customer mobile client device 100a (having been authenticated based on the transmitted authentication token) is sufficiently close to the merchant computing device 110. Various example methods of determining the relative proximity of customer mobile computing device 100a relative to merchant computing device 110 are described in detail below.

Many example implementations of the systems and methods of the present disclosure involve the use of the Bluetooth Low Energy protocol, which allows for the detection and estimation of the proximity of customer mobile computing device 100a relative to merchant computing device 110 based on a relative signal strength. However, it is to be understood that the Bluetooth implementations described herein are provided as example implementations based on currently available protocols, and that the systems and methods disclosed herein may be implemented on, or adapted to, other technical protocols and systems that may currently exist, or may be developed in the future. In some embodiments, the methods disclosed herein may be adapted for classic Bluetooth implementations that allow relative signal strength information to be obtained upon device pairing. For example, in some embodiments, other approaches may be employed for proximity detection, either as an alternative to, or in addition to, the use of Bluetooth for proximity detection. Examples of alternative methods and systems are contemplated and disclosed in further detail below.

Referring again to FIG. 1A, remote server 120 is connected to, or connectable to, customer mobile computing device 100a, and to merchant computing device 110, through a wide area network 125. Customer mobile computing device 100a accesses network 125 through a wireless communications network (such as through a GPRS, 3G, HSPA+, or 4G/LTE network). This remote connection facilitates the remote transmission and processing of secure information associated with a mobile commerce transaction (such as credit card, debit card third-party gift card, virtual currency such a BitCoins, redemption of points or other forms of loyalty or reward based currency, or other payment details and/or credentials, and the transmission of an authentication token to the customer mobile computing device).

This remote communication of secure information, through an external network, may be beneficial in providing a more secure and robust solution that is less susceptible to eavesdropping or other security breaches than systems that rely on local exchange of such secure information. Remote server 120 also allows for indirect communication of other information, such as messages, between customer mobile computing device 100a and merchant computing device 110. It is to be understood that although FIG. 1A shows a single merchant location with a single merchant computing device 110, the systems and methods of the present disclosure may include or involve multiple merchant locations, each with one or more merchant computing devices, which are connectable to remote server 120. Accordingly, the example system shown in FIG. 1A may be adapted to accommodate multiple merchants and multiple merchant locations.

Referring again to FIG. 1A, payment gateway 140 may be a computing system (for example, a server or related computer hardware) associated with an e-commerce application service provider, such as a service provide which offers services to authorize and accept payments for e-businesses, online retailers, bricks and clicks, or traditional brick and mortar. For example, payment gateways may be employed to protect credit card details by encrypting sensitive information, such as credit card numbers, to ensure that information is passed securely between the customer and the merchant and also between merchant and a payment processor.

Figure 1B:
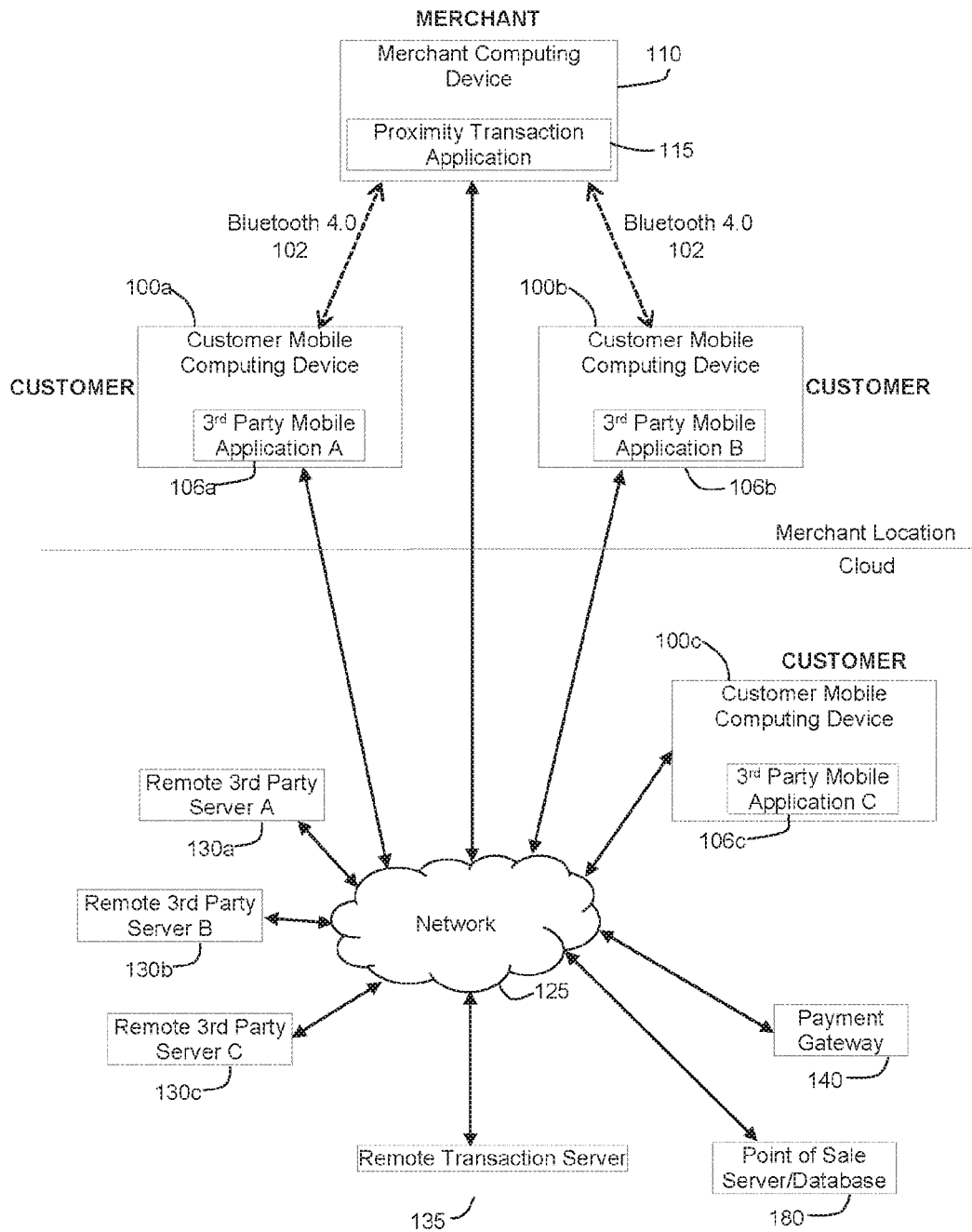
FIG. 1B is a block diagram illustrating another example mobile commerce system according to an example implementation, including a remote third-party server and a remote transaction server.

FIG. 1B provides an alternative example system implementation in which the mobile applications running on the customer mobile computing devices 100a-c are third-party mobile applications 106a, 106b and 106c (e.g. third-party "apps"). Third party mobile applications 106a, 106b and 106c communicate, through external network 125, with remote third-party servers 130a, 130b, and 130c, respectively.

Remote third party severs 130a, 130b, and 130c in turn communicate with remote transaction server 135, which serves as a hub, or effectively a middleware hardware component, facilitating communication between the third party servers 130a-c and merchant computing device 110.

This allows merchant computing device 110 to run a generic proximity transaction mobile application 115 that is not uniquely associated with a single third party mobile application, and can instead interface (optionally simultaneously) with customer mobile computing devices running different third-party mobile applications.

Proximity transaction application 115 is therefore capable of interfacing with multiple third-party mobile application 106. For example, proximity transaction application 115 may obtain a list of different third-party mobile applications 106a, 106b, 106c from remote transaction server 135 to which it may interface. This list may be presented to the merchant user, so that the merchant user can select a set of third party apps that will be employed to process customer transactions. Accordingly, a standardized workflow may be employed for the processing of transactions across a wide variety of all third-party mobile applications 106.

This embodiment therefore enables the merchant to process transactions with many different third parties, each optionally with their own specific and proprietary mobile application. Instead of having to manage the complexity of multiple interfaces for different third parties, the present example embodiment facilitates interactions between multiple third parties and third party mobile applications in a manner that is transparent from the perspective of the user operating merchant computing device 110. Accordingly, this embodiment provides an implementation that is "app agnostic" from the perspective of the merchant. As an example, third-party mobile application 106 may be an app such as Groupon that is configured to run a customer mobile computing device (e.g. a smartphone) and to communicate with a remote proprietary server. Merchant device 110, however, need not, in this example system, run a Groupon-specific proximity transaction mobile application, but instead runs a generic proximity transaction mobile application 115 that is capable of interfacing with multiple third parties (including, in the present example, Groupon) via remote transaction server 135.

It is to be understood that although FIG. 1B shows a single merchant location with a single merchant computing device 110, the systems and methods of the present disclosure may include or involve multiple merchant locations, each with one or more merchant computing devices, which are connectable to remote transaction server 135. Accordingly, the example system shown in FIG. 1B may be adapted to accommodate multiple merchants and multiple merchant locations, in addition to multiple third parties and third party applications.

Various embodiments of the present disclosure provide methods of facilitating secure interactions between a customer and a merchant, at or near the merchant premises or location, based on proximity detection and/or estimation. In some embodiments, a local and/or remote authentication protocol may be employed to establish the security of a proximity-based transaction (electronic transactions taking place at or near a merchant location or premises). As described in further detail below, the authentication protocol may include (i) identification of the customer at the merchant location based on proximity, and (ii) validation of the customer and merchant identity according to remote processing steps (e.g. performed "in the cloud").

In some embodiments, a local wireless protocol capable of providing relative signal strength information, such as Bluetooth 4.0 (or Bluetooth Low Energy) may be employed to determine proximity of a mobile customer computing device relative to a merchant computing device at or near the merchant location, and remote (cloud) processing may be employed to validate the customer identify and/or credentials. For example, as described below, in some example implementations, the Bluetooth 4.0 (Bluetooth Low Energy) Relative Signal Strength Indicator (RSSI) measure may be employed as a means or mechanism to determine proximity of one or more customer mobile computing devices relative to one or more merchant computing devices.

According to some example embodiments of the present disclosure, mobile commerce transactions are performed based on an initial order, purchase, reservation or pre-purchase, of a product or service, where the order is placed by a customer using an electronic interface, and the subsequent completion of the transaction at a merchant premises. In other example embodiments, mobile commerce transactions are performed based on newly initiated transactions by a customer having already arrived at a merchant premises. The following series of example flow charts demonstrate one example implementation of facilitating a mobile commerce transaction, including the following: customer registration, initial digital purchase/order, proximity based check-in and authentication, and purchase redemption at merchant location.

Figure 1C:
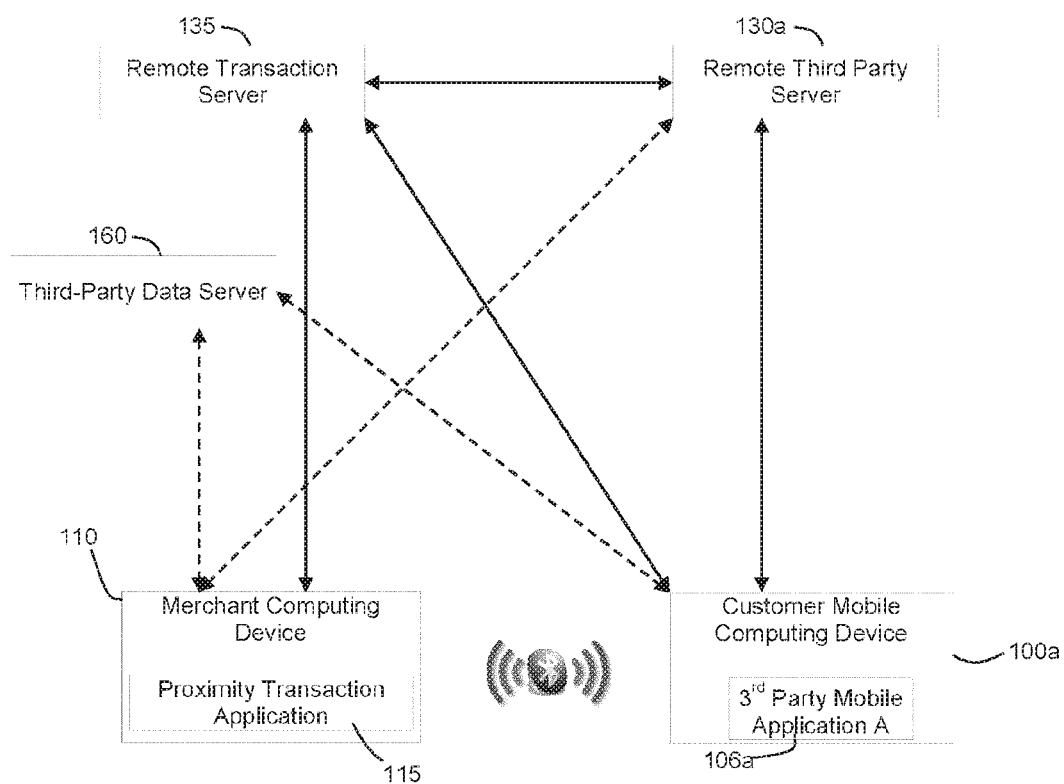
FIG. 1C schematically illustrates the communication between the customer mobile computing device, the remote third party server, the remote transaction server, and the merchant computing device, according to various example embodiments.

FIG. 1C illustrates the different communication paths that may be established between customer mobile computing device 100, merchant computing device 110, remote third party server 130, and remote transaction server 135. As described above, local wireless signals are transmitted between customer mobile computing device 100 and merchant computing device 110, for proximity-based authentication.

Figure 1D:
FIG. 1D is a screenshot illustrating the inclusion, in the user interface of the merchant device, of additional third-party data associated with a given customer.

According to various example embodiments described herein, the local wireless signals may be Bluetooth Low Energy (BLE) signals (either via active or passive communication, as described further below). The remainder of the communication channels shown in the figure are achieved through an extended network using a secure channel (e.g. SSL/TLS). As described below, in some cases, customer mobile computing device 100 communicates directly with remote transaction server 135 over a secure channel, while in other cases, customer mobile computing device 100 communicates with remote transaction server 135 indirectly, through remote third party server 130. As shown in FIG. 1C, remote third party server 130a, or a third party data server 160, may be employed to provide third-party customer data for display on merchant computing device 110. An example of the display of such third-party customer data is shown in FIG. 1D, which shows an example screenshot of the user interface of the merchant computing device 110 in which additional customer data has been included. It is noted that in an alternative embodiment, the third-party customer data may be provided by remote transaction server 135, instead of, or in addition to, third-party data server 160 or third-party remote server 130.

In addition to presenting the additional third-party customer content, the user interface may additionally be employed to collect additional customer data. The additional customer data may include, for example, customer metadata such as customer "tags" 20, as shown in FIG. 1D. For example, in an example application involving a clothing merchant, the user interface of the merchant device may be configured to accept input from a merchant user to include measurements of the customer, while interacting with the customer.

The customer metadata may additionally or alternatively be transmitted to third-party data server 160 and/or remote third-party remote server. The transmission of the customer metadata may be useful for performing customer analytics, and/or for analyzing customer trends or patterns across a set of customers.

In one example implementation, upon the detection (or authorization, as described below) of a customer at a merchant's premises, additional customer data may be automatically, or selectively populated onto the user interface of merchant computing device 110. For example, when a customer is checked into the merchant computing device via local wireless proximity detection, the merchant computing device may indicate whether or not additional customer data exists for this customer. For example, in order to view additional data, the user interface may configured such that the additional customer data is presented upon receiving input, such as a swipe of a customer's name that is displayed on the user interface (e.g. among a list of other customers). In some example embodiments, credentials may be required in order to access the customer content.

It is noted that the additional customer data that is optionally presented to the merchant user on the user interface of the merchant computing device may be obtained from content that was previously entered by the merchant during previous customer interactions, and/or the additional customer content may be obtained from the third-party data server 160 or remote third-party server 130.

FIG. 1D provides examples of some different forms of additional customer data that may be displayed to the merchant user. For example, customer profile data may be selectively displayed when a "profile" tab 25 is selected. Similarly, points data and history data may be selectively presented upon selection of the "points" tab 30 or "history" tab 35, respectively. A status bar 40 may also be shown, In order to conveniently present key customer data to the merchant user. Also, as shown in FIG. 1D, previous tag metadata that was previously entered may be displayed in metadata display region 45. Any or all of the displayed metadata tags may also be provided remotely by the third-party data server 160 or remote third-party server 130. For example, metadata pertaining to the customer may be remotely collected based from social media postings made by the customer, or by friends or contacts of the customer.

Figure 2:
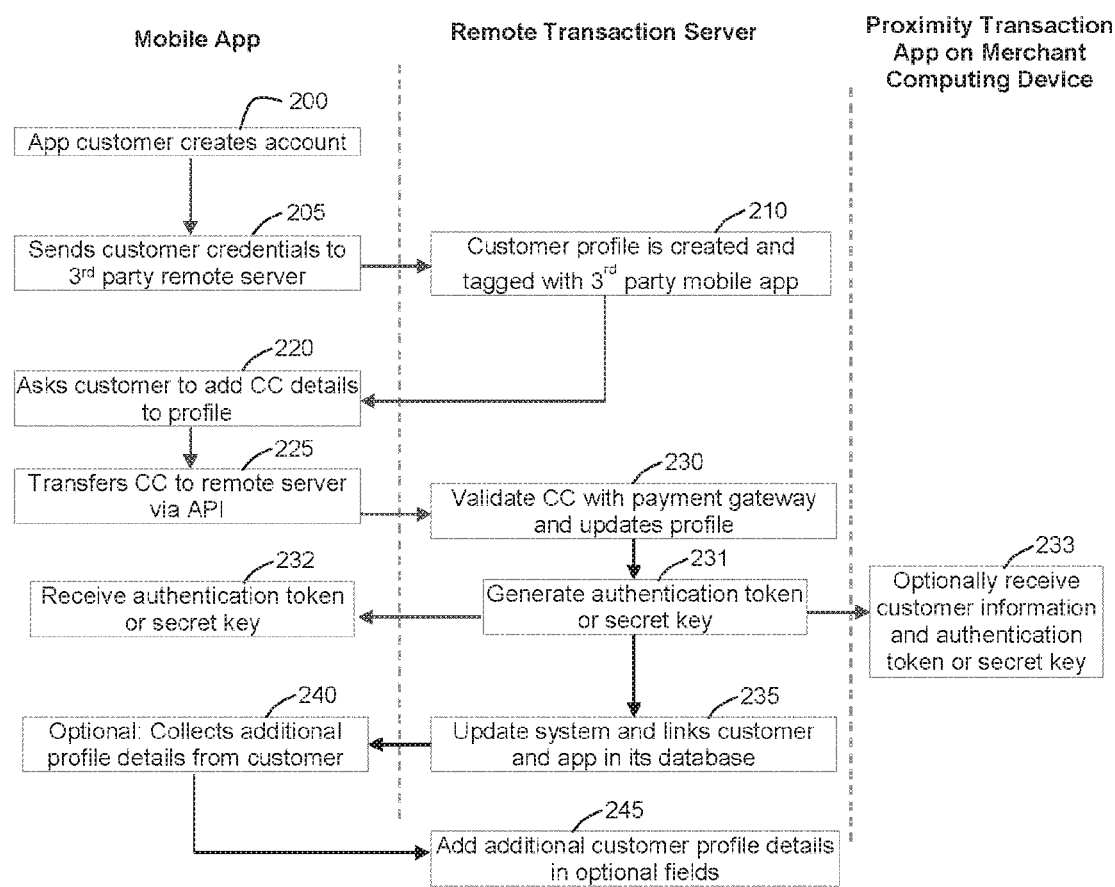
FIG. 2 is a flow chart illustrating an example implementation of a method of registering a user with a mobile commerce system.

Referring now to FIG. 2, a flow chart is provided illustrating an example implementation of the registration of a customer using a third party application, such that mobile commerce transactions can be initiated via a customer mobile computing device associated with the customer.

At 200, the customer selects or runs a third party application on the customer mobile computing device and enters information (including customer credentials) to create a customer account. The third party mobile app sends user credentials, through the remote third party server, to the remote transaction system server at 205, which creates a user profile and links it to the third party app id at 210. The third party mobile app may then prompt the user to enter his payment information (e.g. credit card information) at 220, and sends it securely to the remote transaction server, at 225. Secure communication between the customer mobile computing device, the remote third party server, and the remote transaction server, may be achieved via an encrypted communication protocol, such as SSL/TLS, in which a secret key is symmetrically shared. The remote transaction server validates the credit card information with a payment gateway at 230.

As shown at 231, an authentication token or secret key is generated, which is securely sent to the customer computing device (mobile app) at 232 (e.g. optionally through the remote server associated with the app). As described further below, the authentication token or secret key is employed during proximity-based authentication of a customer at a merchant location (the secret key may be employed to generate an encrypted authentication token by the customer mobile computing device). This initial generation of an authentication token, or secret key, can be employed to facilitate proximity-based authentication for cases involving direct payment at the merchant premises, without requiring pre-payment.

In some embodiments in which local authentication is to be performed (i.e. authentication at the merchant premises), the authentication token or the secret key, and information identifying the customer, may be provided to the merchant computing device, as shown at 233. Such embodiments may be useful in the processing of redemption-based mobile commerce transactions, as described further below.

The user profile is updated with the credit card information at 235. This validation may include authorization of a subsequent purchase transaction to be conducted when the customer arrives at the merchant location. As shown at 240, additional user profile details may be obtained (for example, at any time) by the third party app, and these details may be provided to the remote transaction server (as shown at 245).

Figure 3:
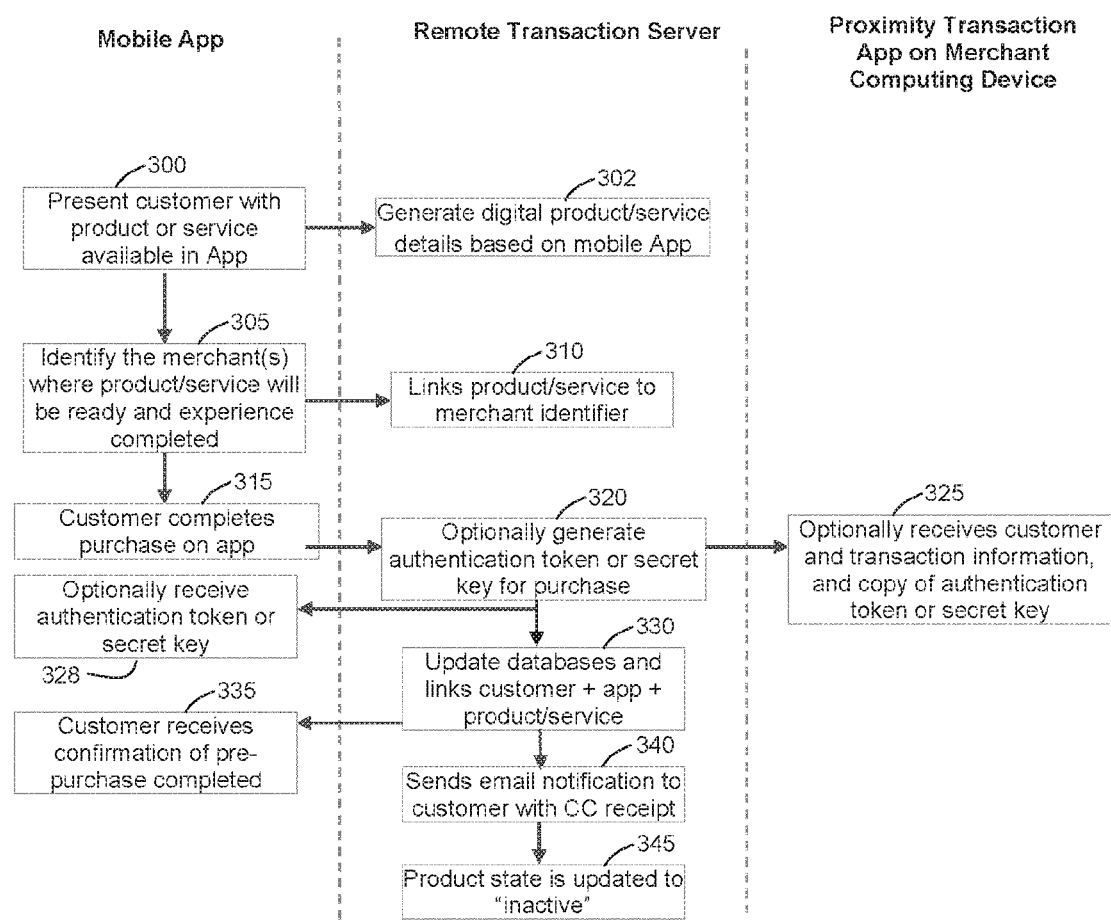
FIG. 3 is a flow chart illustrating an example implementation of a method of performing and facilitating a digital purchase.

Referring now to FIG. 3, a flow chart is provided depicting an example implementation of the digital order, reservation, or pre-purchase step of a mobile commerce transaction. However, it will be understood that the present flow chart demonstrates but one example of a mobile commerce transaction, and that other transactions may also be performed, such as direct payment transactions that do not involve pre-order or pre-purchase.

As shown in the figure, a customer who has a pending transaction is henceforth referred to as an "active customer". At 300, the third party mobile app presents information associated with the product or service to the customer, and allows the customer to select the product or service to order, reserve, or purchase. Information identifying the selected product or service is then communicated, via the remote third party server, to the remote transaction server at 302, which generates digital product details.

The merchant location (or locations) where the product or service may be obtained is then communicated to the customer at 305, and this information is sent to the remote transaction server via the remote third party server at 310. This can be achieved, for example, by providing to the customer via the mobile app, an indication in the app of where they may go to obtain (e.g. pick up) the product or service. In another example, the merchant location could be pre-set or pre-configured in advance, whereby a certain product or service is linked to one or more merchant locations. For example, a concert ticket could be fixed to a specific location, while a McDonald's meal could require user to select the location they want to pick up the meal.

The third party mobile app may identify the merchant location for the customer, for example, based on information provided by the remote transaction server, or, for example, based on information provided by the remote third party server. For example, the remote transaction server and/or the remote third party server may include, or may be configured to access, a third party database (e.g. third-party data server 160) of merchant locations associated with various products and/or services. Such a database may contain inventory Information, which may be updated to reflect the status of pending and/or complete mobile transactions.

As shown at 315, the customer completes the order, reservation or pre-purchase via the third party mobile app. If the customer mobile client device does not already have an authentication token or secret key (as described with reference to FIG. 2, remote transaction server may generate an authentication token or secret key at 320, which is securely sent to the customer computing device (mobile app) at 328 (e.g. through the remote server associated with the app). The remote transaction server then optionally links the product or service to the customer id at 330 and to the third party app id. As noted above, in some embodiments in which local authentication is to be performed during redemption (i.e. authentication at the merchant premises), the authentication token or the secret key, and information identifying the customer, may be provided to the merchant computing device. Furthermore, pre-purchase details associated with the pending transaction may be sent to the proximal transaction app at 325, and associated with customer identity (or with the authentication token or secret key). Such an embodiment may be used to achieve local authentication, as described in further detail below.

It will be understood that while many of the example implementations described herein relate to a single merchant computing device at a single merchant location, other embodiments may involve one or more merchant locations, each with one or more merchant computing devices. In such cases, the communication of information from the remote transaction server to the merchant computing device (such as for the purpose of transmitting an authentication token or other information) may take place between the remote transaction server and any or all merchant computing devices at any or all of the merchant locations.

Referring again to FIG. 3, the remote proximity transaction server sends a confirmation with a payment receipt (if payment is made during the ordering process) to the third party mobile app through its remote server at 335, which displays the information to the user confirming that the purchase was completed successfully. As shown at 340, an email notification with a payment receipt may be sent to the customer, by the remote transaction server, in the event that a pre-purchase was made (as noted above, in other embodiments, a product or service may be pre-ordered or reserved, without making a pre-purchase, optionally by performing an initial payment authorization without executing the payment). The remote transaction server then updates the product/service status to inactive at 345, as the merchant is awaiting the arrival of the customer at a merchant location to complete the transaction.

Although the steps shown in FIGS. 2B and 3 are described with reference to a mobile application, it will be understood that some of the customer registration process steps, and the steps in placing the order, reservation or pre-purchase may alternatively be performed using another non-mobile computing device, such as a desktop computer connected to a remote server via the internet.

Figure 4A:
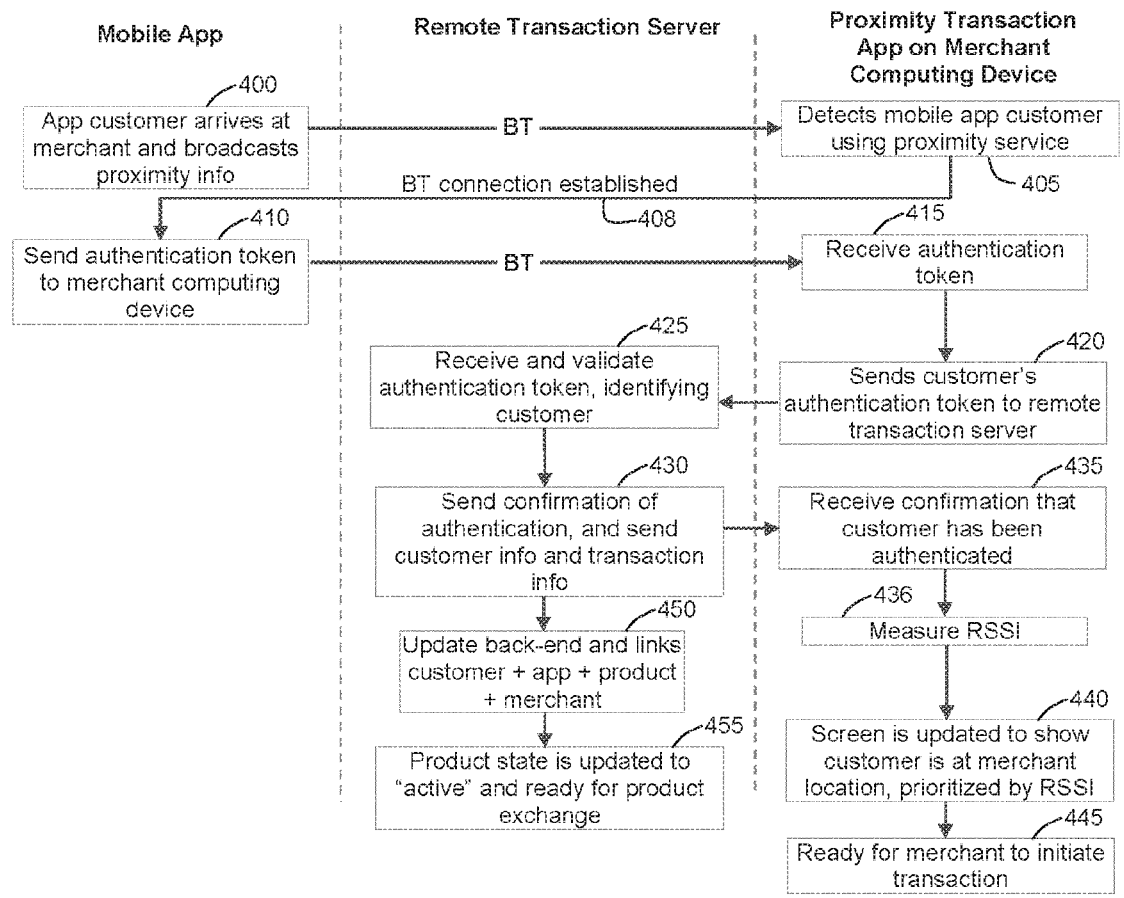
FIG. 4A is a flow chart illustrating an example implementation of a method of checking-in, Identifying, and authenticating a user at or near a merchant location, according to a remote authentication protocol.

Referring now to FIG. 4A, a flow chart is shown depicting an example implementation of the proximity-based remote authentication of a customer at a merchant location. The customer, having made a purchase within the third party mobile app, arrives at or near the merchant location at 400 in order to perform a new mobile commerce transaction, or, for example, to receive an ordered, reserved or pre-purchased product or service.

The customer mobile computing device interacts with the merchant computing device using Bluetooth Low Energy signals in order to achieve proximity-based authentication. Bluetooth communication may be provided, according to different example embodiments described herein, via active or passive communication. "Active" communication, as used herein, refers to establishment of a communication channel between a central BLE device and a peripheral BLE device.

FIG. 4A illustrates a proximity authentication method using active communication, in which the customer mobile computing device acts as a peripheral device that broadcasts its presence to the merchant computing device, which acts as a central device. For example, at present, all iPhones from 4S and up support BLE peripheral mode and Android L-release devices typically also support BLE peripheral mode. Accordingly, such smartphones may therefore be configured as a BLE peripheral that is beaconing (broadcasting signals), where the merchant computing device receives the signals from the customer mobile computing device and establishes a connection with a customer mobile computing device broadcasting a specific Service UUID, as described in further detail below.

According to the active Bluetooth communication method, the merchant computing device, acting as a central device, scans all peripheral (customer) devices in the vicinity, and connects to each customer mobile computing device broadcasting the specific Service UUID in sequence.

FIG. 4A shows an example method in which a customer mobile computing device broadcasting the specific Service UUID is identified by the merchant computing device, and a connection is established, as shown at 408. This connection is employed to transmit the authentication token from the customer mobile computing device to the merchant computing device. As noted above, the authentication token may be provided to the customer mobile computing device by the remote transaction server, or may be generated by the customer mobile computing device, based on a secret key that was provided by the remote transaction server.

Accordingly, after having established the active communication channel, the third party mobile app running on the customer mobile computing device sends the authentication token to the proximity transaction app running on the merchant computing device at 410.

This authentication token is then sent from the merchant computing device to the remote transaction server, for remote authentication. Accordingly to the present example method, the authentication token is provided in an encrypted form, such that the authentication token is not decrypted locally, and is only decrypted remotely by remote transaction server 135. A benefit of this approach is that if the merchant computing device is a malicious device, it would not be able to obtain the customer identifying information due to the inability of establishing a connection with remote transaction server 135. It is noted, however, that while it is beneficial to transmit the authentication token in a secure fashion, the present embodiment may be practiced without encrypting the customer identification information.

The remote transaction server having received the authentication token, performs a remote authentication process that identifies the customer based on the received authentication token. In the case in which the authentication token was initially provided to the customer mobile computing device, the remote transaction server validates the authentication token with its own copy at 425, thus identifying the customer. Alternatively, if the authentication token was generated, by the customer mobile computing device, using a remote key provided by the remote transaction server, then the remote transaction server employs the secret key (which it possesses and previously securely shared with the customer mobile computing device) to decrypt the authentication token in order to obtain decrypted customer identifying information. The secret key, or the decrypted user identification information, is then used to identify the customer (for example, by cross-referencing with a customer database).

Remote transaction server then communicates with the proximity transaction app to provide information identifying the customer and to confirm that the customer has been remotely authenticated at 430, which is received by the proximity transaction device at 435. Remote transaction server also sends information pertaining to an active transaction associated with the customer (if one is pending), so that the merchant can process a pending transaction. It is noted that the information identifying the customer may include a photograph of the customer.

In some embodiments, as described further below, the relative signal strength indicator (RSSI) of the customer mobile computing device, as measured by the merchant computing device, or vice versa, may be determined and processed in order to prioritize the customer list shown on the proximity transaction app, such that customers located closest to the merchant computing system have a higher prioritization. For example, customers having been detected at or near the merchant location having a higher prioritization, based on the relative signal strength of the local wireless connection, may be placed higher on a list of active customers than customers with a lower relative signal strength. The measurement of the RSSI is shown at 436, and is described in detail below.

Although FIG. 4A shows the RSSI values being employed by the merchant device to prioritize the display of the customers, it is noted that the processing of the RSSI values in order to determine the proximity-based prioritization of customers may alternatively be performed remotely via the remote transaction server. In such an alternative embodiment, the measured RSSI values are dynamically provided to the remote transaction server, which processes the RSSI values and dynamically determines the proximity-based prioritization of the customers, and dynamically provides this information to the merchant computing device. It is noted that the local processing of the RSSI values to determine the proximity-based prioritization of the authenticated customers may be advantageous because the need to continually send RSSI data to the remote transaction server is avoided.

The proximity transaction app updates its display (user interface) to show that the authenticated customer is at merchant location at 440, such that a user operating the merchant computing device can be made aware of the customer's presence. The display of the customer, relative to other identified customers, is prioritized according to the measured RSSI value. The proximity transaction app may then optionally send an update to the remote transaction server. The merchant is then ready to initiate a transaction whereby the product or service is provided to the customer, as shown at 445.

The remote transaction server then updates its back-end database, linking the merchant location/identity with the customer, app, and product at 450. The product status is then set to "active" at 455, indicative of the presence and authenticated status of the customer at the merchant location.

The completion of the authentication process reflects the transmission of the authentication token in a transmission loop through both the external network (linking the remote transaction server to both the customer mobile computing device and the merchant computing device) and the local wireless communication between the customer mobile computing device and the merchant computing device, all without requiring the direct local transmission of sensitive information (such as credit or payment information) between the customer mobile computing device and the merchant computing device.

In the method illustrated in FIG. 4A, remote authentication of the customer is performed based on an authentication token that is passed, via local wireless transmission, from the customer computing device (running a mobile app) to the merchant computing device (running the proximity transaction app). Such a method may be useful for a wide range of transaction use cases, including pre-order or pre-purchase transactions (where the customer has pre-ordered or pre-purchased a product or service prior to arriving at the merchant location) and including other transactions in which the customer has not pre-purchased the product or service.

An alternative implementation of an authentication method, Involving local authentication of the customer at the merchant premises, may be performed in which the authentication token that is transmitted from the customer computing device to the merchant computing device is compared to a local copy of the authentication token that has been provided to the merchant computing device after a pre-purchase or pre-order event. Such an embodiment may be employed, for example, if a customer has pre-ordered or pre-purchased a product or service, and if information was transmitted to the merchant computing device prior to arrival of the customer at the merchant premises. The information that is provided may include customer identification information, transaction information associated with the pre-ordered or pre-purchased product or service, and the authentication token that will be used to locally authenticate the customer. For example, the transmission of this information to the proximity transaction app is shown at 325 in FIG. 3. In such a case, when the merchant computing device is provided with the authentication token associated with a pre-order or pre-purchase made by a customer, local authentication of the customer can be performed at the merchant premises without needing to perform remote authentication by the remote transaction server.

According to one implementation, the following steps may be performed to achieve a double authentication protocol (double handshake protocol):

Handshake #1 between customer mobile computing device and merchant computing device (e.g. via Bluetooth 4.0):

Detect presence of customer at location ("Check-In")

Establish proximity with merchant device ("Locate User")

Pass 'authentication token' from customer mobile computing device to merchant computing device ("handshake #1")

Handshake #2 via merchant computing device with cloud:

Validate customer's 'authentication token' with cloud via transmission of authentication token obtained from customer mobile computing device to remote transaction server ("handshake #2"); and Send confirmation to merchant computing device that second handshake is completed and validated.

Figure 4B:
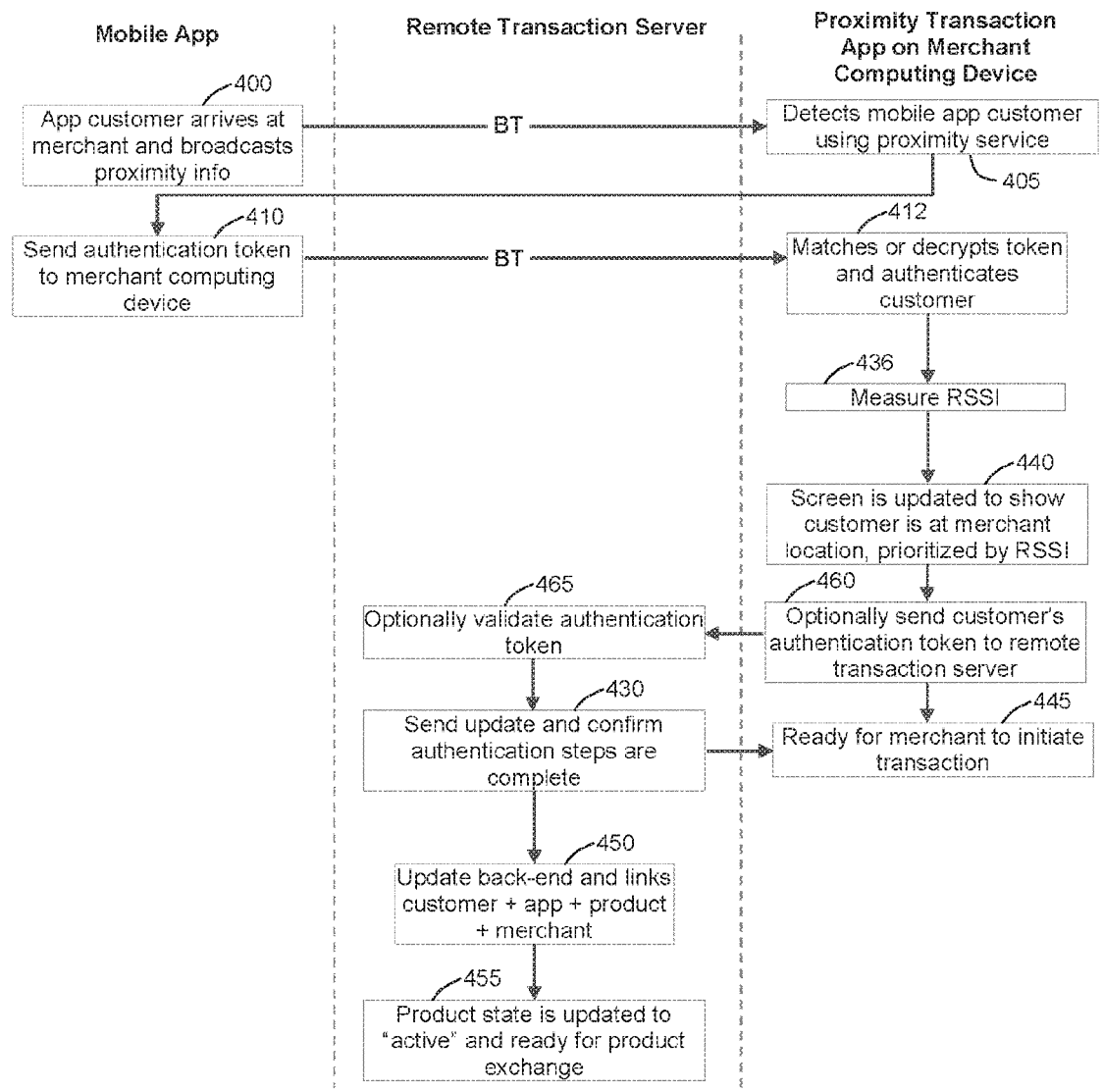
FIG. 4B is a flow chart illustrating an example implementation of a method of checking-in, identifying, and authenticating a user at or near a merchant location, according to a local authentication protocol.
Figure 4C:
FIG. 4C is a screenshot of an example merchant computing device, illustrating an example implementation of the prioritization of the customer list based on detected proximity, including a separate optional display of customers for which proximity information is not available.

An example flow chart of such a local authentication method is illustrated in FIG. 4B, where at step 412, the authentication token that is locally transmitted by the local wireless connection between the merchant computing device and the customer mobile computing device is compared with the local copy residing on the merchant computing device. In other words, the proximity transaction app matches the authentication token with its local copy at 412, which was provided according to the method described in FIG. 3. This matching of the authentication token, based on the local wireless transmission of the authentication token between the customer mobile computing device and the merchant computing device, completes a first handshake in the authentication process.

This local authentication step allows the proximity transaction to display, to the merchant user, information pertaining to the identity of the customer and the nature of the transaction, as well as a confirmation that the customer's identity has been authenticated. This can be performed without requiring communication between the merchant computing device and the remote transaction server, thereby reducing the latency in achieving customer authentication, and providing a more rapid and robust authentication protocol in cases in which the connection between the merchant computing device and the remote transaction server is intermittent and/or of poor quality.

As shown in FIG. 4, after performing local authentication, the RSSI value is measured in order to enable proximity-based prioritized customer display, as shown at 436. The prioritized list of customers, sorted by proximity as determined by the RSSI values, is then updated on the merchant computing device.

Furthermore, remote authentication may also optionally be performed by transmitting the authentication token (received from the customer mobile computing device) to the remote transaction server, as shown at 460 and 465. This optional embodiment provides a double authentication protocol that involves local and remote customer authentication based on the local wireless transmission of an authentication token between the customer mobile computing device and the merchant computing device. The authentication process may be completed via steps 430-455, in a manner similar to that illustrated in FIG. 4A.

As shown in FIGS. 4A and 4B, the measurement of the RSSI value allows for the proximity-prioritized display of authenticated customers. Such an embodiment is illustrated in the example screenshot of a merchant computing device shown in FIG. 5A. The screenshot includes a customer list region 550, which shows information associated with customers that have been detected as being currently present at or near the merchant premises, which may optionally be only active customers who have made a digital pre-order, reservation, or pre-purchase. The display of the customer information may include a photo of the customer, allowing the merchant user to visually verify the identity of the customer.

The list is optionally displayed as two sub-lists, as shown in the figure, including sub-lists 560 and 570. Sub-list 560 includes, and prioritizes the display of, those customers for whom proximity information is available (e.g. via measurements of the relative signal strength of a wireless transmitter of a customer's mobile computing device). Accordingly, customer Janet Smith (at 562) is displayed at the top of the list because the relative signal strength associated with her customer mobile computing device is higher than that of customers Greig Davis (at 564) and Kerri Lock (at 566). Similarly, customer Greig Davis (at 564) Is displayed with a higher list priority than Kerri Lock (at 566) because the relative signal strength associated with his customer mobile computing device is higher than that of hers.

Although customer Janet Smith (at 562) is displayed with highest priority, at the top of the list, this does not necessarily mean that she is standing in close proximity to the merchant computing device. For example, all three customers could be within the store, but not near the merchant computing device. Accordingly, in some embodiments, a visual indication and/or an audible signal is provided when a relative signal strength associated with at least one customer exceeds a pre-selected threshold that is indicative of close proximity between the a customer and the merchant computing device. For example, a visual indicator on the merchant device may be triggered, providing an indication (or alert, or alarm) that a customer at the top of the list (and possibly one or more additional customers in the list) are in close proximity to the merchant device.

In one example implementation, a visual indicator is associated with the display of each customer having a relative signal strength indicator value exceeding the selected threshold, such that it is clear to the merchant user which customers are proximal to the merchant computing device. This may be achieved, for example, by modifying the colour or font associated with the display of the customer information, or, for example, displaying a proximity indicator icon associated with a customer, or for example, flashing one or more details associated with the customer, such as the customer's first name. It will be apparent to those skilled in the art that many alternative methods may be employed to indicate the proximity of a given customer.

Sub-list 570 may also be optionally included to display information associated with those customers for whom arrival at or near the merchant location has been detected or otherwise confirmed, but for whom proximity information is not available. For example, customers 575 may be using a customer mobile device that is not equipped with a local wireless transceiver supporting a determination of relative signal strength.

Customers added to sub-list 570 may be added to the list on first-come basis, such that the prioritization is based on the time at which a connection to the customer mobile computing device is first established. As transactions are completed, they may be moved to the bottom of the list (or optionally removed from the list), such that the next customer having been detected at the merchant location is displayed at the top of the list. Accordingly, once the first customer in sub-list 570 has completed the transaction, the next customer having arrived at the merchant location will automatically be displayed at the top of the list. Dynamically managing the list of the customers within sub-list 570 in this manner enhances the convenience of identifying and prioritizing customers on the merchant device, even when proximity information is not available for such customers.

In one example embodiment, a search bar may be provided to allow a merchant user to search for specific customers (for example, by name or by product or service that has been ordered, pre-purchased or reserved). Such an embodiment may be useful, for example, in cases where a customer shown in sub-list 570 may reside at or near the bottom of sub-list 570, and thus may not be visible to the merchant user.

Figure 4D:
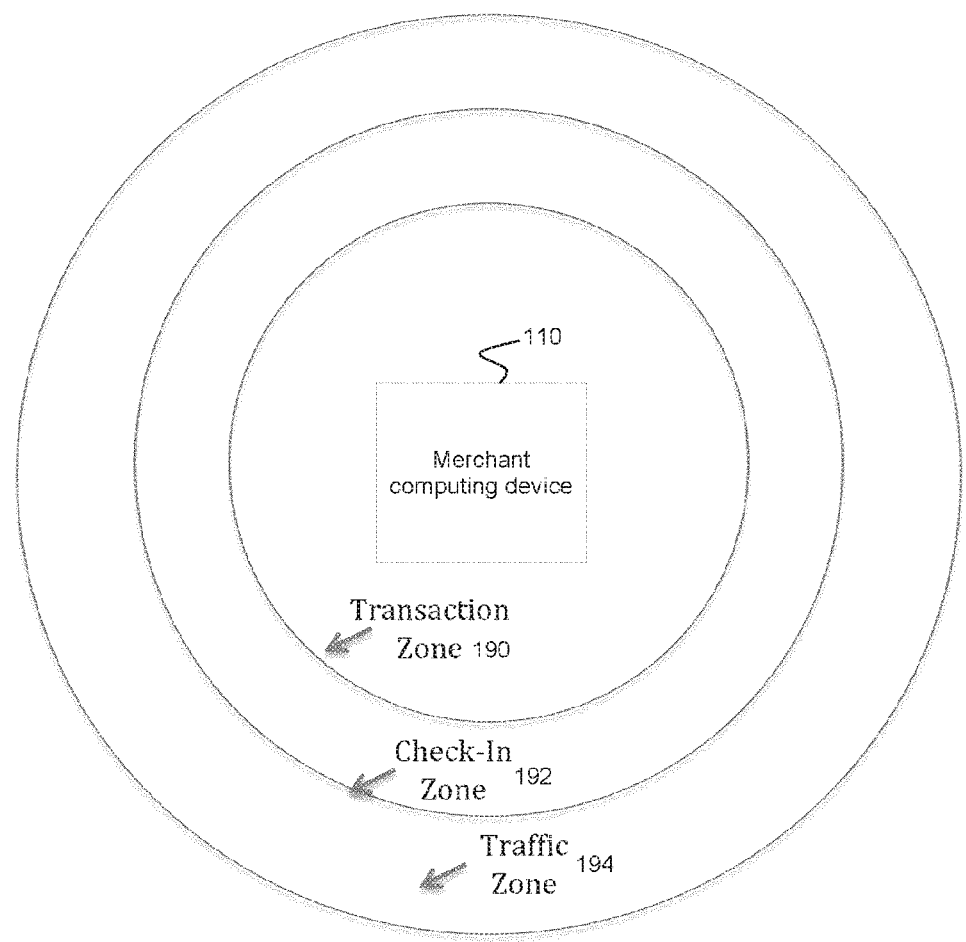
FIG. 4D illustrates the sorting of the location of a given customer mobile computing device into one of several different zones based on the detected RSSI value.

As shown in FIG. 4D, the RSSI information may be employed to establish the location of a detected customer mobile computing device in one of several proximity zones, which radiate outward from merchant computing device 110. According to one example embodiment, the display of customers on a user interface of merchant computing device may vary depending on the proximity zone in which the customers are determined to reside. For example, the user information may be presented in colours that depend on the proximity zone.

In another example implementation, the functionality of the mobile app running on the customer mobile computing device, and/or the functionality of the proximity transaction app running on merchant computing device 110, with respect to a transaction associated with a given customer mobile computing device, may be configured to depend on the proximity zone in which the customer mobile computing device is determined to reside. Non-limiting examples of such proximity zone dependent functionality rules are described in the following description of FIG. 4D, in which the three different proximity zones are illustrated.

The first proximity zone, surrounding merchant computing device 110, is transaction Zone 190. This proximity zone has the shortest range, such that within the transaction zone, the customer mobile computing device is determined to be in front of, or near, merchant computing device 110. For example, the transaction zone may extend from merchant computing device 110 to a radius of approximately 5 m (or alternatively, for example, to a radius of 2 m, 3 m, 4 m, 10 m, or 15 m) from merchant computing device 110. On the user interface of merchant computing device 110, an indication is provided to show that the customers with this range are within the transaction zone. For example, customers determined to be within transaction zone 190 as per their RSSI signals may be shown in a unique colour.

Furthermore, as described above, the functionality of customer mobile computing device and/or merchant computing device 110 may be controlled such that proximity transactions can be executed for customer mobile computing devices located within transaction zone 190. Some examples of functionalities that may be exclusively available within transaction zone 190, according to the proximity zone dependent functionality rules include:

(a) While in transaction zone 190, a customer can confirm transactions exceeding a threshold amount (for example, over $50.00), for example, by pressing "Confirm" on the mobile computing device.

(b) While in transaction zone 190, a customer can auto-confirm transactions below another threshold amount (for example, under $50.00), without the need to press "Confirm" on their mobile computing device. In this example, the close proximity and physical presence within transaction zone 190 is taken as implicit confirmation of the customer's authorization to approve transactions.

(c) While in transaction zone 190, the merchant can auto-confirm a transaction using auto-confirm functionality available on merchant computing device 110.

Referring again to FIG. 4D, the next zone extending outwardly from merchant computing device 110 is the "Check-In Zone" 194. This is the second zone with medium-ranges associated with a distance range for which the customer mobile computing device is within close proximity of merchant computing device 110, but not close enough to initiate transactions (e.g. a customer is physically within the merchant premises, but has not yet approached a check-out counter. An example range for check-in zone 192 is greater than approximately 5 m (or alternatively, greater than 2 m, 3 m, 4 m, 10 m, or 15 m) but less than approximately 30 m (or alternatively, less than 20 m, less than 25 m, or less than 35 m) from merchant computing device 110.

The customers identified to be located within this proximity zone may be shown in a different colour that those identified to be located within transaction zone 190 (e.g. they may be shown in grey color when they are in identified within check-in zone 192), so that it is clear to the merchant that a given customer is present at their location, but not close enough to perform transactions. Some examples of functionalities that may be exclusively available within check-in zone 192, according to the proximity zone dependent functionality rules include:

(a) While in check-in zone 192, the customer can be manually confirmed by the merchant to be located within sufficient proximity in order to run a valid transaction.

(b) While in check-in zone 192, larger transaction amounts (over $50.00) are not allowed to be processed.

(c) While in check-in zone 192, the merchant can make coupons and promotions available to customer once they have come into the check-In zone. In some embodiments, such promotional offers may be automatically provided to a customer mobile computing device when it is detected within check-in zone 192.

The third zone, furthest from the location of merchant computing device 110, is referred to as the Traffic Zone 194. For example, a customer mobile computing device may be considered to be within this zone at a distance of 30 m or more from merchant computing device 110. Customers identified to be within this zone may also be shown, on the user interface of merchant computing device 110, in a different colour, or, for example, though a different menu option. Some examples of functionalities that may be exclusively available within traffic zone 194, according to the proximity zone dependent functionality rules include:

(a) While in traffic zone 194, the merchant will not be able to process any transactions for the customer.

(b) While in traffic zone 194, merchant will have access to customer mobile computing devices in order to send promotion and marketing messages. In some embodiments, such promotional offers may be automatically provided to a customer mobile computing device when it is detected within traffic zone 194.

It will be understood that the previous examples of proximity zone dependent functionality rules are merely provided as illustrative examples, and that other proximity-based rules may be employed in order to provide proximity-based customer display, and/or proximity-based transaction functionality.

In some embodiments, the merchant computing device may be configured to monitor the customer mobile computing devices in order to detect the dropping of a local wireless connection. For example, if the merchant computing device detects a connection drop (such as due to a BLE failure), then the merchant computing device may automatically refresh or re-initiate the connections. In one example implementation, the following process may be performed to re-initiate connections:

(a) All active connections are dropped;

(b) The app or service facilitating the connections (e.g. BLE) is restarted on the merchant computing device; and (c) All connections are established again.

This approach may ensure, in the context of the embodiments described above regarding the prioritized display of customers on a merchant computing device, that if any customer mobile computing devices are inadvertently dropped from a dynamic customer list, then they will be added back again.

In another example, the merchant computing device may allow an associated merchant user to carry out a manual refresh. When merchant user performs this action, a process similar to that described above may be initiated. This additional functionality provides control to the merchant user to initiate a wireless connection (e.g. BLE) refresh manually (for example, when a customer indicates they are not showing up on the customer list) and avoid any instances of communication failures that merchant computing device may have encountered.

As described below, in some embodiments, interactions between one or more customers at or near the merchant location may be performed using alternative methods other than those that support proximity detection via relative signal strength. Such customers may be present at a merchant location along with other customers that use mobile devices capable of providing relative signal strength. For example, in some embodiments, some customers may be detected, and located, using GPS, and authenticated, for example, via communication with the remote servers. Accordingly, such customers, once authenticated at the Merchant location, may be added to sub-list 570 (the static list). The static list may thus be employed to display, to the merchant user, those customers who are known to be sitting next to or near the merchant location based on their GPS location. As noted below, a wider range (e.g. 100 meters or more) may be employed to match the customer's current location and with merchant location's GPS location.

The proximity-based prioritized display provides a convenient mechanism for a merchant to conveniently select, from a list of customers on the merchant computing device, the customer who is standing next to the merchant computing device, based on the detected proximity of the customer mobile computing device. This provides a heightened measure of security beyond the aforementioned double-handshake protocol. This proximity allows the user operating the merchant computing device to verify that the customer is both present at the merchant location and is physically near the merchant computing device, before allowing a transaction to proceed.

While GPS could provide a general location of the customer ('check-in'), Bluetooth and related protocols that provide relative signal strength indication provide a more accurate method. In addition to 'check-in', such protocols that support proximity detection allow for the customer list (shown on the merchant computing device) to be arranged in order of proximity relative to the merchant computing device. This means that a merchant user may not need to search for a customer when initiating a transaction on the merchant computing device, thus emulating, or simulating, the experience of a traditional cash/card workflow. Furthermore, local wireless protocols that support proximity determination allow both 'check-in' and 'proximity' determination of merchant location and merchant computing device, respectively, providing the initial mandatory security step for a transaction and aligns with merchant workflow.

Figure 5A:
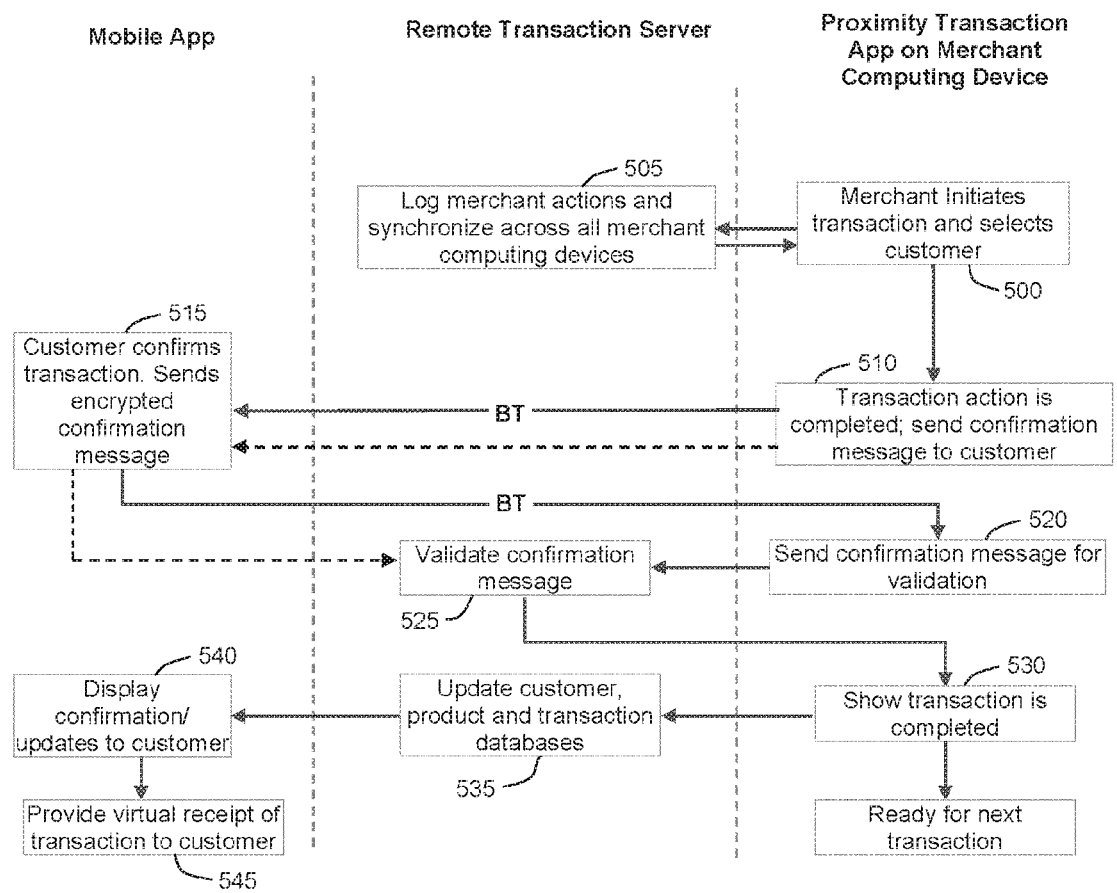
FIG. 5A is a flow chart illustrating an example implementation of a method of performing product exchange at or near a merchant location.

Referring now to FIG. 5A, a flow chart is provided illustrating an example implementation of product redemption method that is performed at the merchant location after having authenticated the customer according to the method described in FIG. 4A or 4B. At 500, a user operating the merchant computing device initiates a transaction and selects an authenticated user shown on proximity transaction app. After having received an indication of the customer based on proximity detection, the proximity transaction app may then send an update to the remote transaction server at 505, and the remote transaction server optionally logs merchant action, and optionally synchronizes across over all merchant computing devices connected to the remote transaction server.

The merchant then completes the required action (e.g. provides the product or service to the customer) and, after receiving input confirming this, the proximity transaction app sends a confirmation message to the third party mobile app via the local wireless connection (e.g. via Bluetooth), or via the remote transaction server, at 510. The third party mobile app then replies with a confirmation message, which may be an encrypted confirmation message, via the local wireless connection (e.g. via Bluetooth), or via the remote transaction server, at 515. In the case of using the local wireless connection to transmit the confirmation message, the merchant computing device forwards the confirmation message to the remote transaction server at 520, which validates the message (e.g. decrypts the message if it is encrypted) at 525, and sends a confirmation to the proximity transaction app. The proximity transaction app displays the confirmation to the merchant at 530. The proximity transaction app sends an update to the remote transaction server, which then updates its user, product and transaction databases, and forwards the update to the third party mobile app through its remote server at 535. The third party mobile app then displays the confirmation and virtual receipt to the customer at 540 and 545.

Figure 5B:
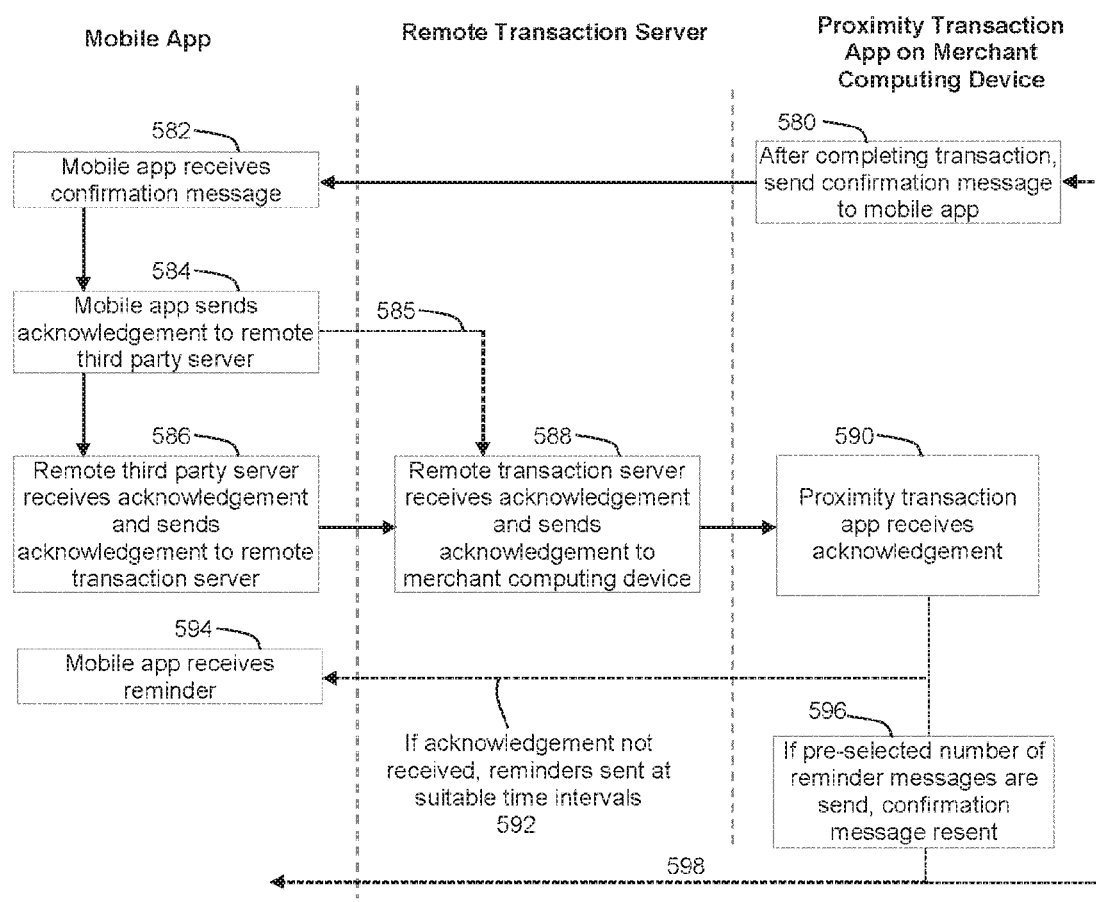
FIG. 5B is a flow chart illustrating an example method of confirming a transaction between the customer mobile computing device and the merchant computing device.

Referring now to FIG. 5B, an optional example method is illustrated for ensuring that the confirmation message and a subsequent acknowledgment are exchanged between the customer mobile computing device and the merchant computing device. Once the merchant device is used to complete a transaction, a confirmation message is sent at 580 using Bluetooth to the mobile app, which is received at 582.

The proximity transaction app of the merchant device then carries out following steps to ensure the confirmation message is sent to the customer mobile computing device, and also to resolve any technical issues with the communication of confirmation message. After the confirmation message is sent using Bluetooth, the proximity transaction app waits for a suitable time duration (for example, 10 seconds) for an acknowledgement of the confirmation message. This acknowledgement may be sent via the remote servers, or directly via Bluetooth, or both.

In the example case of sending the acknowledgement through the remote servers, the acknowledgement may be sent directly from the third party mobile app to the remote transaction server, as shown at 585. Alternatively, the acknowledgement may be initially sent by the mobile app at 584 to the third party remote server. Such an example case is shown in FIG. 5B, in which the remote third party server then sends the acknowledgement to the remote transaction server at 586, which subsequently sends the acknowledgement to the proximity transaction app at 588.

If the acknowledgement is not received by the proximity transaction app at 590 (running on the merchant device) within a suitable time duration (for example, 10 seconds), the merchant device automatically sends a reminder message, as shown at 592. Reminders may be sent at suitable intervals if the acknowledgement is not subsequently received by the mobile transaction app. For example, the merchant device may wait for another 10 seconds and send a second reminder message using Bluetooth.

If, after having sent a pre-selected number of reminder messages the acknowledgement has not yet been received (e.g. after two or more attempts), the confirmation message may be re-sent, as shown at 596. For example, an option to "RE-SEND" may be highlighted on the merchant computing device, and the "RE-SEND" button, once selected, resends the confirmation message. In one implementation, the resending of the confirmation may be performed as shown at 580, via Bluetooth. In another example implementation, the resending of the confirmation message may be performed using an alternative method, such as via the remote transaction server, as shown at 598. In the latter case, the message may be sent to the remote transaction server, and subsequently to the remote third-party server, which may, for example, employ push notification to send the confirmation message to the mobile app.

Through these steps, the system may ensure that the confirmation message is sent to the customer and, as described above, in case of any failure with Bluetooth communication, the confirmation message may be sent to the mobile app customer through an alternative technology (e.g. through an external network connection via the remote servers).

On the mobile app side, similar Bluetooth technology failures may occur when they are responding to the confirmation message. To resolve this potential issue, the mobile app may send a confirmation acknowledgement to the remote transaction server (as shown at 584 and 586) and may optionally also send a confirmation acknowledgment to the merchant device (using Bluetooth). This approach ensures that even if the merchant computing device does not receive the acknowledgment through Bluetooth due to any communication failure, the customer's acknowledgment message (send via the mobile app) is captured by the remote transaction server. When the merchant computing device is awaiting the arrival of the acknowledgment message, and if it is not received from the mobile app via Bluetooth, the merchant computing device may communicate with the remote transaction server and request the delivery of the acknowledgement before sending the reminder again.

In some example implementations, the merchant computing device may be configured to record audio and/or video of a customer interaction. For example, audio and/or video may be recorded, and associated with a given customer, when the RSSI values associated with the given customer's mobile computing device lie within a pre-selected range associated with the proximity of the customer to the merchant computing device. The recorded media may be transmitted to the remote transaction server for archiving. In one example implementation, audio and/or video may be recorded whenever a resend event has occurred, or when any transactions are left unconfirmed. In another example implementation, audio and/or video can be recorded continuously by the merchant computing device, and audio and/or video clips can be extracted and associated with individual transactions and/or customers based on customer proximity detection and/or time.

In some embodiments, the systems and methods described herein may provide for the management and/or communication of inventory levels associated with products and/or the availability of services. For example, referring to FIG. 1A and FIG. 1B, merchant computing device 110 may be employed to store and/or update inventory levels. For example, this information could be provided directly by the merchant user, for example, via a merchant portal or user interface (this could be integrated with the user interface configured to allow the merchant to manage their profile/login/transaction history).

Alternatively, one or more computing devices associated with the system, such as merchant computing device 110, remote server 120, and/or remote proximity server 135 may be integrated with another computing device or database associated with inventory levels, such as a merchant point-of-sale system (such as Micros, NCR, a 3rd party inventory management system), for example, either directly, or using a third party integrator such as eTHOR. This integration could be facilitated (for example, via an application programming interface (API)) between the remote server 120 (FIG. 1A) or remote proximity server 135 (FIG. 1B) and a remote (back-end) server (FIG. 1B) or database 180 associated with the point-of-sale system.

As noted above, in some non-limiting example implementations, merchant users can upload inventory information, or use a third party integrator to upload inventory information from their point-of-sale system to a remote server associated with the present system (such as remote transaction server 135).

In some embodiments, inventory levels associated with products, or information regarding the availability of services, may be presented to the user through the mobile application (e.g. a third party app) running on the customer mobile computing device. For example, referring to FIG. 1B, remote proximity server 135 may be employed to send inventory information to a remote third-party server (e.g. any one or more of 130*a-c*), which may then be sent to a customer mobile computing system. The product inventory and/or service availability information may then be presented to the customer, via the mobile application running on a customer mobile computing device, as products or services that merchants are making available to the mobile community.

For example, in embodiments such as the example system shown in FIG. 1B, the inventory information would be provided to the remote third party server, for subsequently delivery to the third party mobile application operating on the customer mobile computing devices. If a pre-purchase, order or reservation is made, this request is sent to remote transaction server 135, where transaction requests are processed, and appropriate messages are assigned to the product or service that is associated with a merchant.

In some example implementations, remote transaction server 135 may generate and send a message to merchant computing device 110 for approval/authorization prior to reserving a product or service. Upon successful reservation, a confirmation token may be sent, via remote transaction server 135, to the third party app (via the remote third party server), in a manner similar to the example embodiment shown in FIG. 2. This confirmation token may then be stored via the third party customer app (or via the third party app server). Upon entry or arrival of the customer at the merchant location, the confirmation token may verified (for example, via the local wireless connection, such as via Bluetooth), and specific instructions may be sent from remote transaction server 135 to merchant computing device 110 to process the transaction or interaction accordingly (e.g. payment transaction, redemption, and/or dynamic messaging, as described herein). Upon completion, remote transaction server 135 may be employed to update the inventory list, and where applicable, send an inventory update to a point of sale or other external inventory system interfaced with the present system (e.g. via direct integration or through a third party integrator).

Many of the preceding embodiments have employed an active Bluetooth connection between the customer mobile computing device and the merchant computing device. An alternative approach is to employ passive Bluetooth communication, in which a connection is not made between the devices. Such passive Bluetooth communication involves the use of broadcasted BLE signals without establishing a BLE connection between merchant computing device and customer computing device. For example, pre-Android L-release BLE capable phones typically only support BLE in central mode. Such smartphones can only scan peripheral devices that are beaconing, and cannot become a peripheral themselves. Accordingly, in example embodiments involve passive BLE communication, merchant computing device 110 acts as a peripheral, broadcasting a specific Service UUID, which is detected by customer computing device 100 that is acting as a central. Upon detection of a specific Service UUID, the detected device ID can be communicated to the remote transaction server in order achieve proximity-based detection of customer mobile computing device 100 at the merchant premises. In some embodiments involving passive communication, customer mobile computing device 110 only scans for signals broadcasted by merchant computing device 110 when the third party mobile app 106 is in the foreground, in order to minimize battery usage.

Figure 6A:
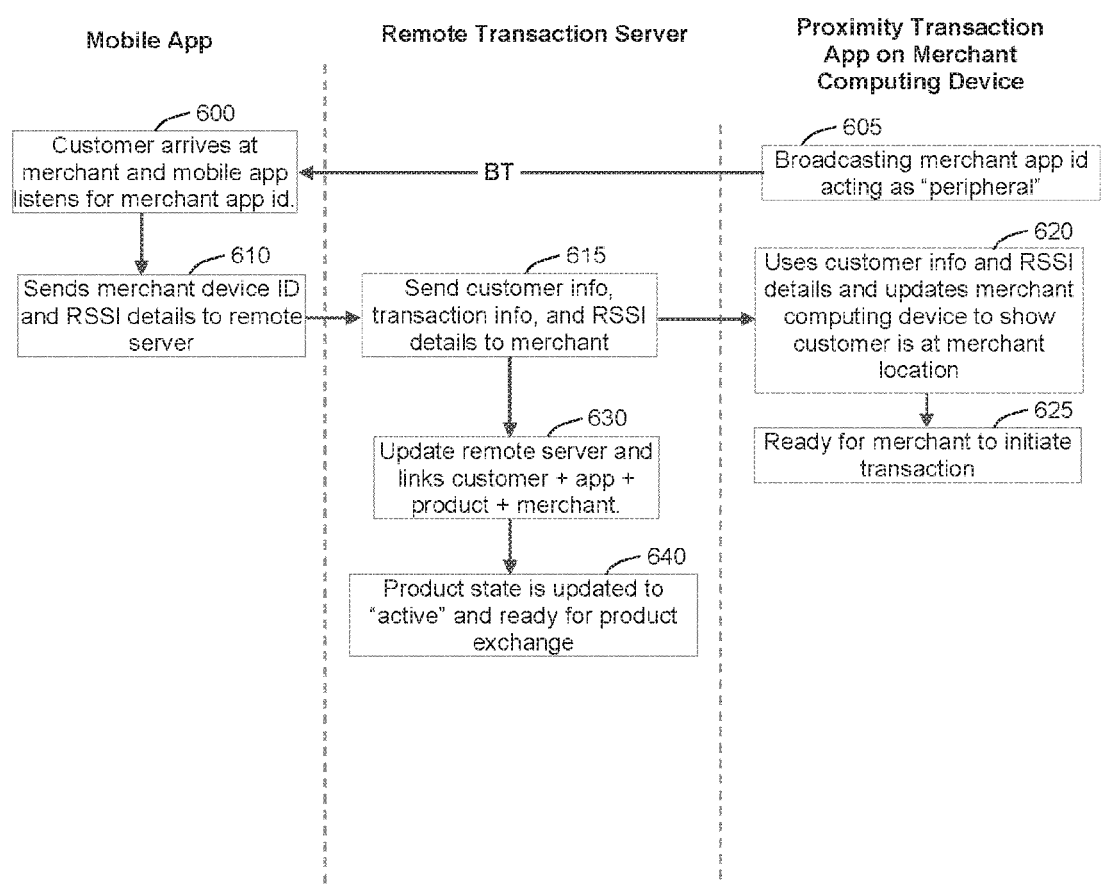
FIG. 6A is a flow chart illustrating an example implementation of a method of checking-in, identifying, and authenticating a user at or near a merchant location without requiring a local wireless connection between the customer computing device and the merchant computing device, in which authentication of the customer is performed remotely, and where RSSI values measured by the customer computing device are provided to the merchant computing device for displaying a proximity-based prioritized customer list.

Referring now to FIG. 6A, a flow chart is provided of an example implementation of a customer check-in (authentication) method employing passive communication. As shown at 600, the customer has ordered, reserved and/or pre-purchased a product or service within the third party mobile app and arrived at merchant location.

The third party mobile app, running on the customer mobile computing device, listens for app id, while the merchant computing device broadcasts its app id over Bluetooth as shown at 605, acting as "peripheral" (or as a "server" in the language currently adopted under the Bluetooth protocol). When the merchant computing device logs into the remote transaction server, it uniquely identifies itself, and the remote transaction server assigns it a unique alphanumeric ID of length 8. This ID is then broadcast by the merchant computing device as its "Bluetooth Device Name". This allows customer mobile computing devices that are scanning to pick up this device name and report it to the remote transaction server, without actually connecting to the merchant computing device. The remote transaction server is able to determine the exact merchant computing device that corresponds to this device name, and push it a "refresh" message. Along with device names, a unique service UUID is also broadcasted. This effectively "namespaces" the device name to prevent collisions with other devices that could be potentially broadcasting the same device name.

As shown at 600, the customer mobile computing devices periodically scan for any merchant computing devices advertising on that unique service UUID. Upon discovery of a merchant computing device having the unique service UUID, customer mobile computing device sends the merchant device name to the remote transaction server to be interpreted, optionally via the third party remote server. It is noted that this communication may be performed over a secure channel, such as via SSL/TLS, such that the remote transaction server can verify the identity of the customer mobile computing device.

At 615, the remote transaction server receives the merchant device name from the customer mobile computing device. If the remote transaction server recognizes the merchant device name and ties it to a specific merchant computing device, it can be assumed that both the customer mobile computing device and the merchant computing device are within Bluetooth range of each other. At this point, the customer is checked-into the particular merchant location, and kept on the customer list for a short period of time. The customer is authenticated via the secure connection between the customer mobile computing device and the remote transaction server. Throughout this time period, the remote transaction server is periodically updated about the presence of the merchant computing device with respect to the customer mobile computing device, further extending its time on the checked-in list.

As also shown at 600, the RSSI value associated with the merchant computing device is determined by the customer mobile computing device, and this RSSI value is also forwarded to the remote transaction server, and the RSSI data is pushed to the merchant computing device. The proximity transaction app uses the relative signal strength indicator details from the remote transaction server to prioritize the display of the customer on the merchant computing device at 620 (as described with reference to FIG. 4C above), updates its display to show the customer is at merchant location, and sends an update to the remote transaction server at 630, which links the customer id with the merchant id. Furthermore, the RSSI information may be employed to determine a proximity zone in which the device resides, as described above an illustrated in FIG. 4D. As noted above, the proximity zone in which the customer mobile computing device resides may be employed to further customize the display of customer information on the user interface of the merchant computing device, and may also be employed to control and restrict the functionality of the customer mobile computing device and/or the merchant computing device. The remote transaction server then updates the product/service status to active at 640.

In some embodiments, the RSSI information is only forwarded to the remote transaction server on an ongoing basis if a change in the RSSI value has been determined to exceed a pre-selected threshold. This reduces the amount of data that is sent to the remote transaction server, and also reduces the amount of data that is pushed from the remote transaction server to the merchant computing device.

Figure 6B:
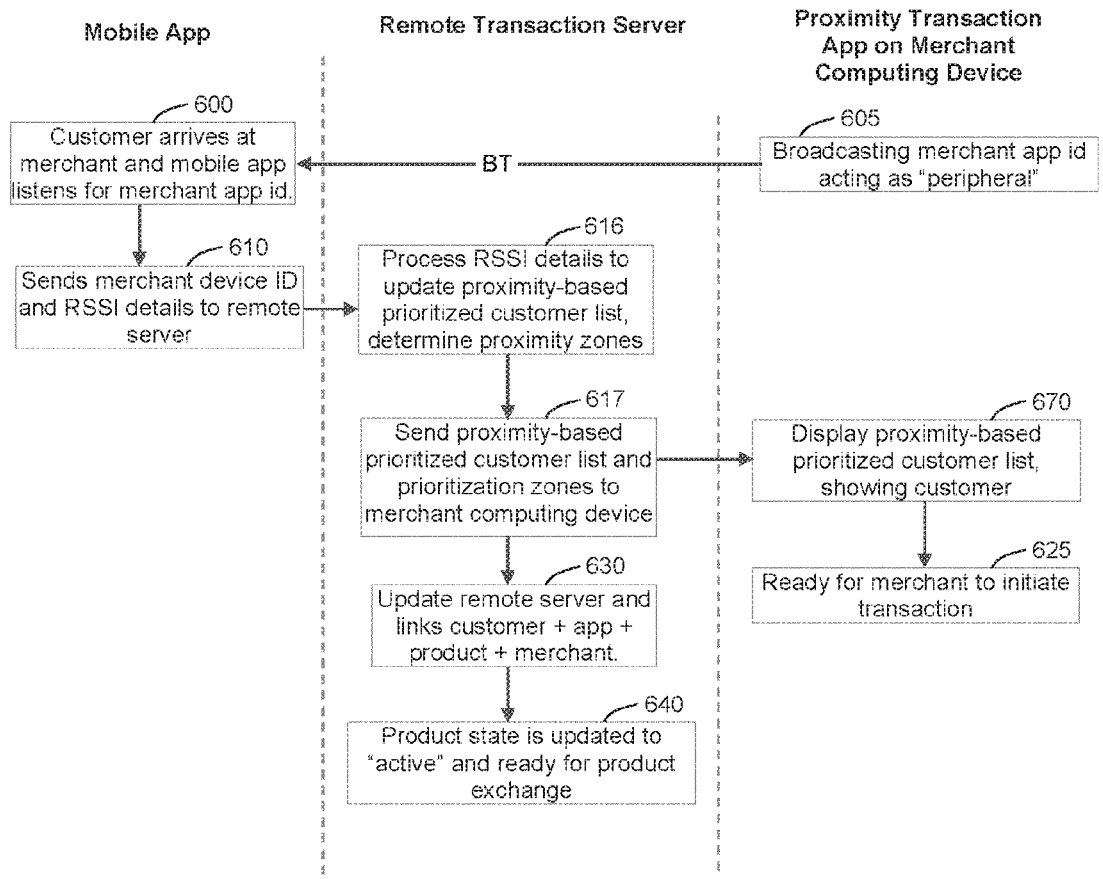
FIG. 6B is a flow chart illustrating an example implementation of a method of checking-in, identifying, and authenticating a user at or near a merchant location without requiring a local wireless connection between the customer computing device and the merchant computing device, in which authentication of the customer is performed remotely, and where RSSI values measured by the customer computing device are processed remotely in order to provide, to the merchant computing device, a proximity-based prioritized customer list.

FIG. 6B illustrates an alternative implementation of the method shown in FIG. 6A, in which the RSSI information that is obtained by the customer computing device, and passed to the remote transaction server, is processed remotely to determine the prioritization of customers (see 616). The prioritized list of customers is then sent to the merchant computing device at 617. The merchant computing device receives the prioritized customer list at 670, and displays the customer list on its user interface according to the prioritized order. As shown in the figure, the proximity zone in which each identified customer resides may also be communicated to the merchant computing device.

Figure 7:
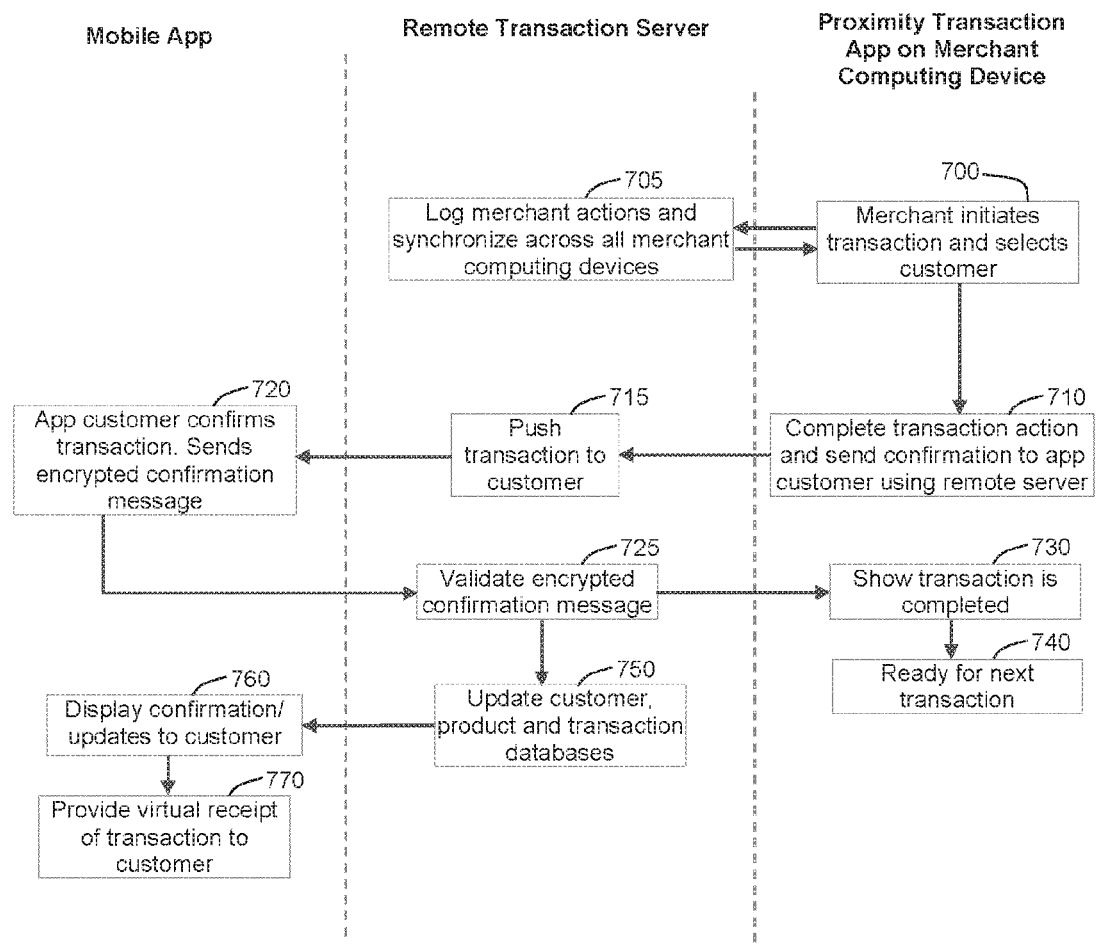
FIG. 7 is a flow chart illustrating another example implementation of a method of performing product exchange at or near a merchant location.

It will be understood that although many of the preceding examples have been described within the context of a merchant computing device acting as either a peripheral or as a central—in other words, using either active or passive Bluetooth communication with customer mobile computing devices, it will be understood that in some embodiments, the merchant computing device may operate in a mixed mode, supporting both the aforementioned active protocols shown in FIGS. 4A, 4B, 5A and 5B, and also supporting the aforementioned passive protocol shown in FIGS. 6A, 6B and 7. Such an embodiment may be useful when customers are expected to use devices that may only support one of these modes. Furthermore, in other example embodiments, one or more customer mobile computing devices may be configured to operate in mixed active/passive modes, so that a given customer mobile computing device is capable of performing a proximity-based transactions with merchant computing devices that are configured as a peripheral or a central. In some embodiments, both the merchant computing device and the mobile computing device may be configured to operate in active or passive mode, in order to enable communication via either active or passive protocols. For example, if the active protocol is deemed to be problematic, the system may be reconfigured to operative passively in order to circumvent the problem.

Referring now to FIG. 7, a flow chart is shown that illustrates an alternative example implementation of the redemption of a product or service at a merchant location, based on the passive communication method described in FIGS. 6A and 6B. At 700, the user operating the merchant computing device initiates a transaction and selects an authenticated user within the proximity transaction app, and the proximity transaction app sends an update to the remote transaction server, At 705, the remote transaction server optionally logs merchant action, and optionally synchronizes across over all merchant computing devices. The merchant completes required action (e.g. provides the ordered, reserved or pre-purchased product or service to the customer) at 710, and sends confirmation from the proximity transaction app to the third party mobile app at 715, through the remote transaction server and the remote third party server.

The third party mobile app replies with a confirmation message at 720, through the remote third party server, which is received and validated by the remote transaction server at 725. The proximity transaction app displays the confirmation to the merchant at 730, and is ready to process the next transaction at 740. The remote transaction server updates its customer, product and transaction databases at 750, and forwards the update to the third party mobile app through its associated remote server. The third party app mobile then displays the confirmation at 760 and provides a virtual receipt to the customer at 770.

It will be understood by those skilled in the art that the methods described in FIGS. 4 and 5, and FIGS. 6 and 7, are provided as illustrative examples that may be modified without departing from the intended scope of the present disclosure. In particular, modifications to the methods described in these figures may include the removal of one or more steps, and/or the addition of steps.

With reference to FIGS. 4 and 6, and similarly, FIGS. 5 and 7, it will be understood that these methods may be performed simultaneously, or in parallel, in order to support proximity-based interactions between a merchant device (or two or more merchant devices) and different groups of customer mobile computing devices, namely those that support interactions according to the methods shown in FIGS. 4 and 5, and those that support interactions according to the methods shown in FIGS. 5 and 7.

In some embodiments, two or more merchant computing devices may be configured as a local network (optionally as a mesh network) within a single merchant location. The multiple merchant computing devices may exchange messages in order to determine which of the merchant computing devices have a connection to the remote transaction server. In the event that one or more of the merchant computing devices lose their connection to the remote transaction server, the local network may be employed to route communication from merchant computing devices without a remote connection to those merchant devices that do have a remote connection.

According to one example implementation, if it is determined that none of the merchant computing devices are connected to the remote transaction server, then the merchant computing devices may store the local transactions in their local network (optionally designating one of the merchant computing devices as a master device) and then update the remote transaction server when the connection is resumed. During the time period in which the connection to the remote transaction server is absent, authentication of users may be performed locally, for example, according to the method described in FIG. 4B.

In some example embodiments, the methods described in FIGS. 4 and 5, and FIGS. 6 and 7 may be implemented, for example, using customer mobile computing devices operating the iOST™ and the Android™ operating systems that support Bluetooth Low Energy (Bluetooth 4.0).

The following section describes, in further detail, systems and methods that provide example implementations proximity detection at or near a merchant location using Bluetooth Low Energy and related wireless protocols that provide a measure of relative signal strength.

The inventors have found that for any mobile app using Bluetooth Low Energy technology for proximity detection, there are two fundamental challenges: (i) tracking mobile devices at the same time without establishing alive connection with such devices; and (ii) tracking such devices from a diverse set of phone manufacturers with different implementations of the Bluetooth Low Energy standard (iPhone, Android, Bluetooth Low Energy Smart devices, etc.). These issue are due to the fact that under many current implementations, the "Bluetooth device-UUID (Unique User Identification Device)" continues to change with time and, as a result, causes difficulties in reliably keeping track of a single device's proximity location as a function of time. For example, it has been found by the inventors that the device-UUID may change approximately once every 15-20 minute interval for some Bluetooth implementations. This is understood to be a result of dynamic random device address allocation, which is common to many Bluetooth current implementations (for example, see the Bluetooth 4.0 Specification, Volume 3, Part C, Section 10.8, and the Bluetooth Accessory Design Guidelines for Apple Products; Apple® has also acknowledged this issue and mentioned this in their developer documentation on Core Bluetooth functionality).

More specifically, as a Bluetooth Low Energy peripheral device connects/disconnects with the Bluetooth Low Energy server device, the Bluetooth device-UUID on the Bluetooth Low Energy peripheral device may be frequently reset as a security measure. This makes it problematic for the Bluetooth Low Energy central device to keep track of multiple Bluetooth Low Energy peripheral devices. The present disclosure addresses this challenge through a method of cycling between connecting and disconnecting with Bluetooth Low Energy peripheral devices while maintaining a list of uniquely defined "Bluetooth service-UUIDs", which resides on the Bluetooth Low Energy peripheral devices and is cross-referenced with the list of device-UUIDs maintained on the Bluetooth Low Energy central device. As different Bluetooth Low Energy peripheral devices connect/disconnect from the Bluetooth Low Energy central device, the process maintains the list and keeps track of those devices. Accordingly, with this method, it is possible to keep track of multiple Bluetooth Low Energy peripheral devices and provide relative proximity with improved reliability.

Figure 8:
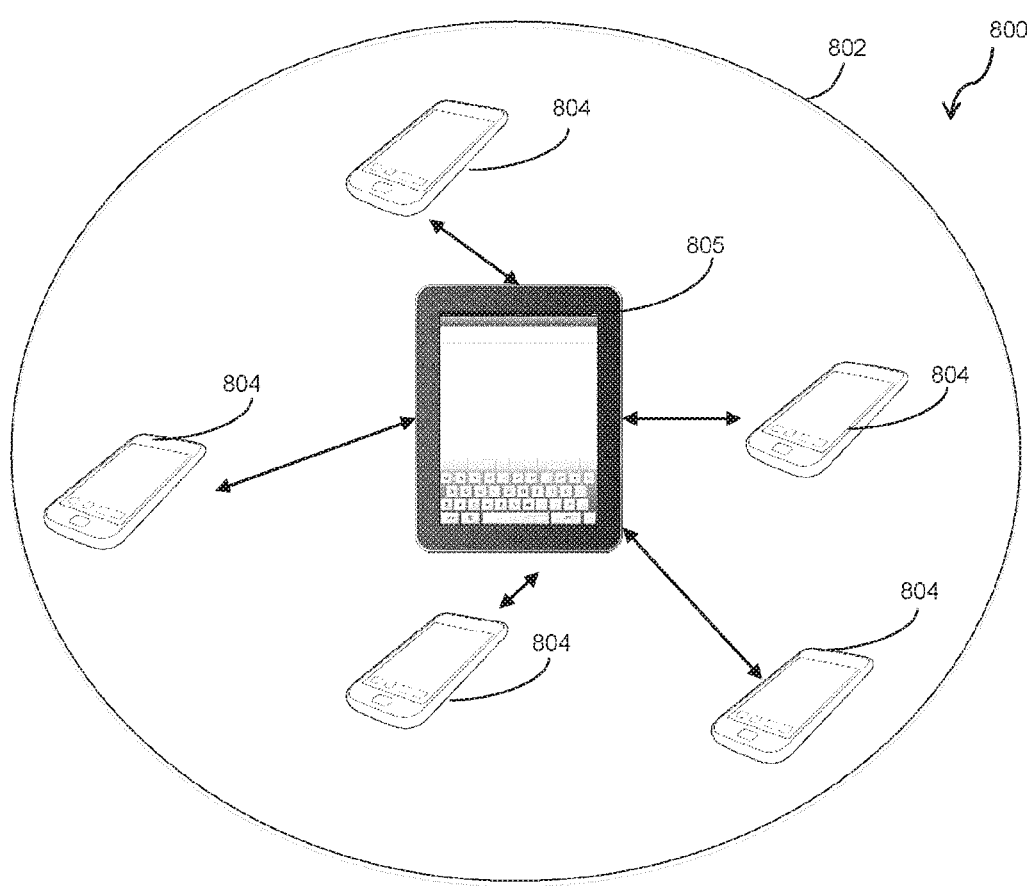
FIG. 8 illustrates the connection of a merchant computing device to multiple customer mobile computing devices via a wireless network.

FIG. 8 illustrates an example Bluetooth communication network 800 and shows the range of Bluetooth signal 802 that is available to the devices coming into this Bluetooth network 800. This Bluetooth network is relative to Bluetooth Low Energy central device 805 (which may be the merchant computing device) and allows any Bluetooth Low Energy peripheral device 804 (which may be a customer mobile computing device) that comes within the range of network 800. Bluetooth network 800 is based on approximately 50 meters radius around Bluetooth Low Energy central device 805. Hence, any Bluetooth Low Energy peripheral device 804 that comes within 50 meters of Bluetooth Low Energy central device 805 can connect/communicate and exchange data with Bluetooth Low Energy central device 805.

In order to track the proximity of any Bluetooth Low Energy peripheral device 804 that comes within the range of Bluetooth network 800, the RSSI (Relative Signal Strength Indicator) value may be employed. This RSSI value provides approximate signal strength received by the Bluetooth antenna that is located on the device; thereby giving an indication of how close and far a given Bluetooth Low Energy peripheral device 804 might be to Bluetooth Low Energy central device 805. The higher the RSSI value, the closer the given Bluetooth Low Energy peripheral device 804 will be to Bluetooth Low Energy central device 805. As the user with the given Bluetooth Low Energy peripheral device 805 moves around from one point to another, the RSSI value for the device changes.

In a scenario as depicted in FIG. 8, there can be multiple Bluetooth Low Energy peripheral devices 804 that are within Bluetooth network 800 and Bluetooth Low Energy central device 805 will be showing the RSSI value for all of them and thereby sort them in a list such as below:

Device 1—Highest RSSI Value
Device 2—Second Highest RSSI Value
Device 3—Third Highest RSSI Value
Device 4—Fourth Highest RSSI Value
Device 5—Fifth Highest RSSI Value This list will be visible on Bluetooth Low Energy central device 805 and shows the devices in that order to reflect the relative proximity of all the Bluetooth Low Energy peripheral devices 804 within the Bluetooth network range 800. Relative proximity is determined by directly comparing the RSSI information of devices coming into the range. However, in one example implementation, a distance can be estimated based on the RSSI value, for example, using the following equation:

$$RSSI[dbm] = -(10n \log 10(d) + A),$$

where d is the distance and A is the offset which is the measured RSSI 1 meter point away from the Bluetooth Low Energy device (http://citeseerx.ist.psu.edu/viewdoc/download?doi=10.1.1.148.6615&rep=rep1&type=pdf). In the above equation, "A" Is the signal strength measured at 1 meter (e.g. page 536 here http://www.s2is.org/Issues/v1/n2/papers/paper14.pdf). It is noted that the RSSI values may be pre-calibrated based on device type, in order to compensate for variations in device power. This may be achieved, for example, by detecting or determining the Bluetooth chip type, and using a curated list of Bluetooth chips with corresponding "A" values. In order to improve the accuracy of determining relative distance. It is noted that the Bluetooth chip model may be inferred from the model of the customer mobile computing device (i.e. the smartphone model), based on publically available data or based on teardown-based hardware analysis of different phone models, which can be stored in the form of a list, look-up table, or other data structure.

The main challenge addressed by this method is that when users with such peripheral devices move around and their associated RSSI value changes, Bluetooth Low Energy central device 805 uses Bluetooth Low Energy device-UUIDs to keep track of different Bluetooth Low Energy peripheral devices. This value uniquely identifies the device to any Bluetooth network 800. As noted above, however, one challenge is that this value often changes periodically as a security measure, since Bluetooth Low Energy peripheral devices 804 are always advertising their device-UUID value along with RSSI information in the public domain.

Figure 9:
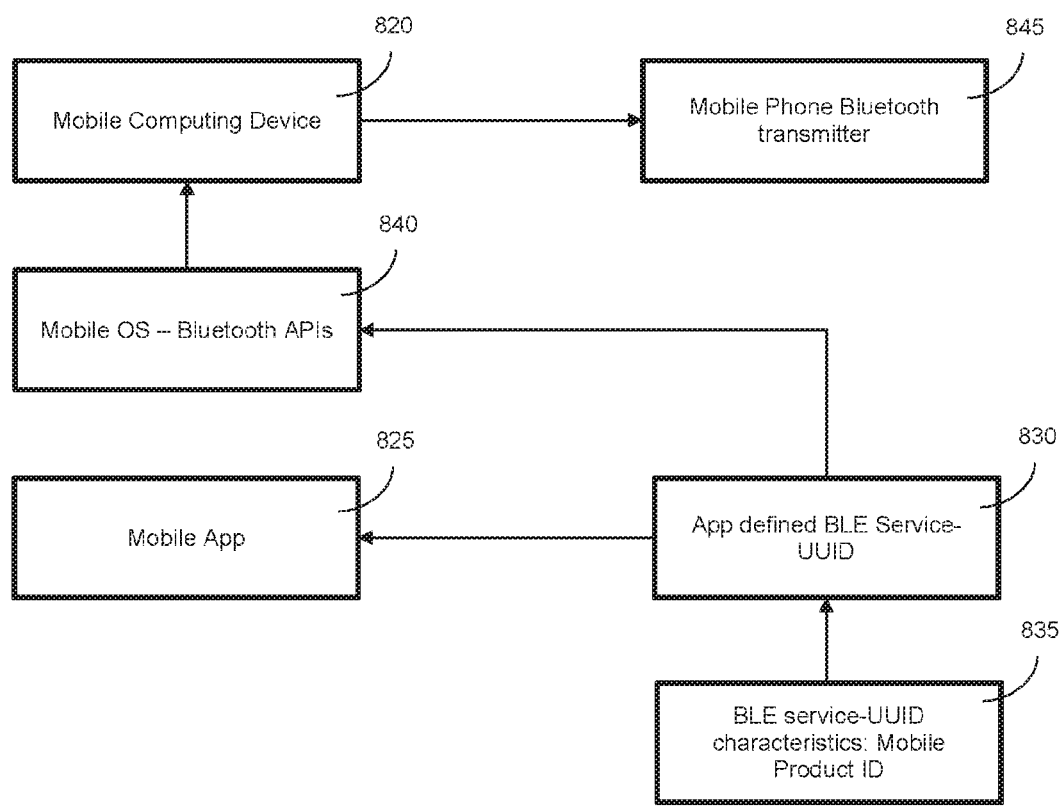
FIG. 9 is a block diagram of an example implementation of a system for facilitating local mobile commerce transaction, where the example system employs Bluetooth Low Energy (BLE) protocol.

According to one example implementation, shown in FIG. 9, peripheral Bluetooth Low Energy devices are prepared in advance with unique Bluetooth Low Energy service-UUID and service-UUID characteristics that will be used to address the challenges mentioned above. As shown in FIG. 9, mobile computing device 820 is employed as a Bluetooth Low Energy peripheral device. Mobile app 825 has been installed on mobile computing device 820. Mobile app 825 includes a uniquely defined Bluetooth Low Energy service-UUID 830, which includes the Bluetooth Low Energy service-UUID characteristic mobile product ID 835. Mobile product ID 835 is unique for each mobile computing device (and mobile app) for which a customer has purchased a product or service. Mobile app 825 employs the mobile OS Bluetooth APIs 840 to communicate with the mobile computing device 820 and obtain access to the Bluetooth transmitter 845.

According to the present example method, Bluetooth Low Energy service-UUID characteristics 835 are transmitted using Bluetooth transmitter 845 to the Bluetooth Low Energy central device once the mobile computing device 820 comes within range of the Bluetooth network associated with the central Bluetooth computing device. According to one example implementation, Bluetooth Low Energy service-UUID characteristics 835 are transmitted to the Bluetooth Low Energy central device both when mobile app 825 is running in background and foreground, hence eliminating the need to keep mobile app 825 in foreground at all times.

Figure 10:
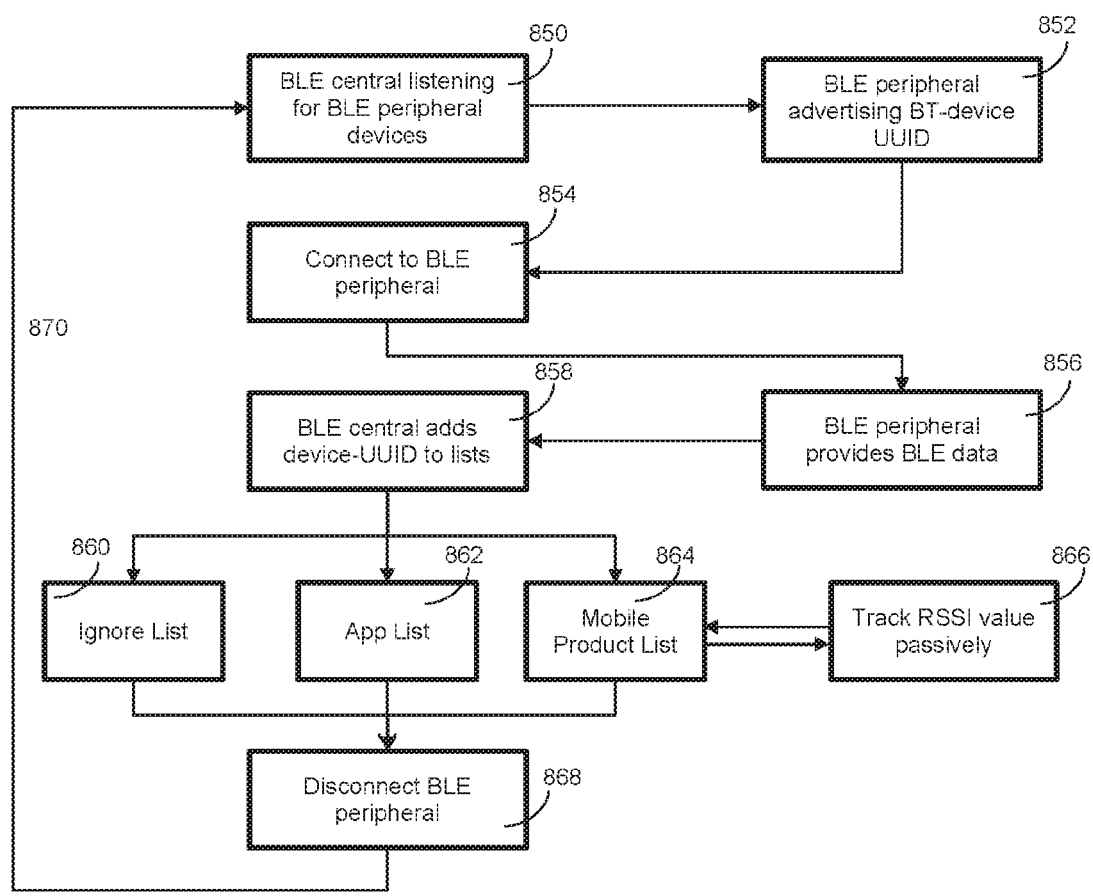
FIG. 10 is a flow chart illustrating an example implementation of a method of connecting and tracking customer mobile computing devices, where the example method employs the Bluetooth Low Energy protocol.

FIG. 10 is a flow chart illustrating an example implementation of a method of tracking multiple Bluetooth Low Energy peripheral devices, even when the device-UUID changes randomly with time, based on the configuration of a peripheral Bluetooth computing device according to FIG. 9. This example method addresses the aforementioned challenges with randomly varying device-UUID values to reliably track multiple Bluetooth Low Energy peripheral devices.

The process starts with 850 where the Bluetooth Low Energy central device is listening for all Bluetooth Low Energy peripheral devices that come within its range and are advertising their Bluetooth Low Energy peripheral device-UUID. Once Bluetooth Low Energy central device detects the Bluetooth Low Energy peripheral device, it establishes a connection 854 with the Bluetooth Low Energy peripheral device. Once the connection is established, Bluetooth Low Energy peripheral device provides the Bluetooth Low Energy data stored on such device at 856. In the case of a Bluetooth Low Energy peripheral device being a mobile device, Bluetooth Low Energy service-UUID including the service-UUID characteristic Mobile Product ID defined by the mobile app (see FIG. 9) are transmitted. In some embodiments, the Bluetooth Low Energy service-UUID characteristic mobile product ID may only available on the Bluetooth Low Energy peripheral devices that have purchased, ordered, or reserved the mobile product or service. Hence, while connection is established at 854, Bluetooth Low Energy central device stores the device-UUIDs and service-UUID characteristics at 858 during this session.

Based on the Bluetooth Low Energy data provided by Bluetooth Low Energy peripheral device at 856, Bluetooth Low Energy device-UUIDs are stored for tracking purposes. According to one example implementation, the device-UUIDs are grouped in three lists, which are defined as follows:

Ignore list 860—This has the list of Bluetooth Low Energy peripheral devices without the App service-UUID. Hence these devices do not have the App and we are not interested in tracking their proximity.

App list 862—This has the list of Bluetooth Low Energy peripheral devices that have the service-UUID associated with the app. These devices are of interest for tracking based on Bluetooth Low Energy data collected in 856. If a mobile product ID is not found in service-UUID characteristics, then the device is maintained in this list as it has not participated in a mobile commerce transaction yet, and is not of current interest at this point in time.

Mobile Product list 864—These Bluetooth Low Energy peripheral devices have Mobile Product Id in the service-UUID characteristics. These are the devices that are to be tracked by the Bluetooth Low Energy central device.

From this point onwards, Bluetooth Low Energy central device is able to keep track of RSSI value of these devices passively and doesn't need to maintain an ongoing connection. The Bluetooth Low Energy central device proceeds to disconnect from the Bluetooth Low Energy peripheral device at 868 and continues through 870 to listen for other Bluetooth Low Energy peripheral devices and proceed through this cycle in order to keep track of other Bluetooth Low Energy peripheral devices that reside within range. In one implementation, after one cycle is completed, and there is a device-UUID added in the Ignore List 860, Bluetooth Low Energy central device will not connect to those Bluetooth Low Energy peripheral devices in 850 as those are not of interest for the app. In an alternative implementation, subsequent connection attempts are made each cycle to the devices in the ignore list, in case one such device is initially not running the app, but the app is subsequently run by a customer while the device within the Bluetooth network range.

During these cycles, as the Bluetooth central device comes across a Bluetooth Low Energy peripheral device with a mobile product ID, whose device-UUID has changed, the mobile product list 864 may be interrogated (processed) to match the App service-UUID and Mobile product ID in order to ensure that it is the same device that was previously detected and captured in the list at 858. This system therefore provides a mechanism to reliably track proximity of all the different Bluetooth Low Energy peripheral devices as they move around within the Bluetooth network 1.

In some cases, it may be necessary to communicate with an app on a Bluetooth Low Energy peripheral device (such as an iPhone), for which the app is in background and the Bluetooth Low Energy peripheral device is locked. In such a case, as a result of this process whereby the Bluetooth Low Energy central device maintains a list of Bluetooth Low Energy peripheral devices, this also allows a Bluetooth Low Energy central device, such as an Apple iPad, to communicate with the Bluetooth Low Energy peripheral devices such as iPhones while the mobile app is in the background or foreground. In the example case of an iPhone, typically once an app is in a closed state, or the screen is locked, all mobile apps are pushed into the background. With the present method, a mobile app with this implementation will have the additional capability where a Bluetooth Low Energy central device (such as an iPad) can communicate over the Bluetooth network with the Bluetooth Low Energy peripheral devices even if the app is in background. Accordingly, based on the Bluetooth Low Energy peripheral device (such as an iPhone) maintained in the mobile product list 864 as explained above, a central device such as an IPad will be able to passively communicate and/or connect with the peripheral device within the Bluetooth network.

In some embodiments, there are instances in which device UUIDs are added to the Ignore List, after which they continue to remain in this list. As a result, if there is a peripheral that gets added to the Ignore List, then according to the embodiment described above, the central will not interrogate the device again. This will result in that peripheral being permanently placed in the Ignore List for the session, even if a customer associated with the peripheral proceeds to download the app (in which case it should be placed in the App list) and purchase a mobile commerce product (in which case it should be placed in the Mobile Product list).

In order to avoid this issue, the peripheral may be interrogated one or more additional times, in order to determine whether or not it should be promoted to one of the other lists. For example, a counter may be associated with each UUID as it gets added to the Ignore List. As a new UUID is detected, a counter is initiated which keeps track of how many times the UUID is added to the Ignore List. At each round, the peripheral is interrogated to determine whether or not this UUID has Mobile App services and (and optionally, characteristics) that the central device is seeking. After the counter reaches a given threshold value, then that device UUID may be will be kept in Ignore list for the active session.

It will be understood that the UUIDs stored in the table may be released periodically. For example, In one embodiment, once a user associated with the central device logs out of the central device, all the UUIDs may be released from the Ignore List, such that the list is cleared. With this approach, after a logout, when a new sessions starts, a fresh list of UUIDs is maintained in Mobile Product List, App List and Ignore List.

In one embodiment, the RSSI value associated with a given customer mobile computing device may be averaged over multiple readings in order to improve the proximity detection. For example, it has been found that RSSI values may fluctuate after certain intervals, which could result in irregular jumps in the displayed customer list shown in FIG. 4C. To resolve this issue, the average value of a pre-selected number of RSSI values may be determined, and this average value may be used to sort the customers in a relative proximity list. This approach allows the irregular jumps in RSSI values to be reduced or minimized. According to various example implementations, the number of RSSI values employed to construct the average may be approximately 2-5, 5-10, 10-20, or greater than approximately 20 values. For example, by averaging approximately 20 values, irregular spikes/jumps in RSSI values are substantially reduced, and jumps in user list are manageable.

In one example implementation, a Kalman filter algorithm may be employed to reduce temporal and spatial RSSI variation. A modified version of Kalman filter that estimates the speed of variation may be employed to predict the future possible values, such that RSSI variation can be reduced based on past, current and future predicted values. This method may also be able to address some parts of small and large scale variations. The update of current RSSI and its variation speed can be found using the expressions listed in: Pu et al., "Indoor Location Tracking Using Received Signal Strength Indicator", Chapter 11, "Emerging Communications for Wireless Sensor Networks", edited by Anna Foerster and Alexander Foerster, ISBN 978-953-307-082-7, Published: Feb. 7, 2011. Although many of the preceding example implementations have been described using Bluetooth technology and protocols, it is to be understood that these example implementations may be modified to employ other wireless protocols and technologies that are capable of facilitating proximity detection and/or estimation. Non-limiting examples of additional implementations are described below.

WIFI Connection

Using a WiFi connection, it is possible to validate that a broad range of peripheral devices (such as an iPhone or Android phone) are within a defined proximity of the server device (for example, an iPad, tablet, laptop, etc.). For example, this may be achieved by pre-configuring the devices to be on the same WIFI network. A WIFI router or related device (such as a mobile hotspot) may be provided at the merchant location, which may be managed and configured to provide a WiFi SSID. Manual setup may be performed by device users to connect the devices on the common Wifi (using the WiFi SSID). In one example implementation, multiple devices may be pre-configured, in advance, to use the same WiFi network.

Once peripheral devices come within the range of WiFi network, they may be identified to the central device and the physical presence of peripheral devices can be validated. Based on this method, authentication tokens can be exchanged between peripheral and central devices. Once the authentication step is complete, mobile commerce transactions can start between peripheral and central devices (e.g. a customer mobile computing device and a merchant computing device).

Proximity Based on Cellular GSM Connection

According to this example embodiment, proximity detection may be determined based on the widely available GSM information of peripheral devices. Such location information on some peripheral devices (iPhone, Android, etc.) may not be accurate and reliable, as it involves a triangulation method based on the signal strength and proximity with GSM Cellular Network towers. For example, such proximity information may be accurate within approximately 100 meters or more. Also, the calculated location may be inaccurate because mobile phones receive GSM signals from different Cell Towers within a phone's range, and indoor environments may complicate and impair the triangulation process. Nonetheless, such methods may be useful in some cases for proximity-based detection.

Proximity Based on GPS

According to one example implementation, the physical/fixed GPS information of the merchant computing device may be employed for proximity-based authentication and transaction processing. The GPS location information could be made available to customer mobile computing devices using a remote connection through an external network, such as via back-end cloud services. When a customer mobile computing device comes within a pre-selected proximity (for example, within 100 meters) of the merchant computing device, as determined based on a GPS signal received by the customer mobile computing device, the customer mobile computing device then proceed with an authentication process. An authentication token or encrypted authentication message will be exchanged with server using a remote transaction server, as described in detail above. A "refresh" message will be pushed to the merchant computing device, and the merchant computing device will then send the customer identifying information (e.g. including a customer photo) to the merchant computing device. Such an embodiment may be useful for customer mobile computing devices that are not BLE-capable (e.g. older IPhones and older Android smartphones). Once authentication is complete, the merchant computing device will identify the customer mobile computing device being at same physical location as merchant computing device. Having achieved this authentication based on proximity, remaining mobile commerce transaction steps will be followed. All communication between merchant and customer mobile computing devices may be performed using via the remote transaction server, as described above, which may play a broker role to transmit data between server and peripheral devices.

According to one example GPS-based Implementation, with reference to FIG. 4A, when the customer mobile computing device comes within a predetermined proximity of the merchant computing device, the mobile app may send the authentication token to a remote server (e.g. a back-end cloud service) along with GPS coordinates of the customer. This information will be processed by remote server, and the authorization token will be exchanged from the customer mobile computing device to the remote server. Similar steps to those described above can be followed for the customer to perform the remaining mobile commerce steps with merchant computing device (server device). With reference to FIG. 5A, the delivery and acknowledgement of the confirmation message may be performed using push notifications. The remote Server may play the broker role to pass the "confirmation token" from the merchant computing device to the customer mobile computing device and then receive acknowledgment in same manner.

As mentioned above, RSSI information may not be available in such an embodiment, and it may only be possible to determine whether or not the peripheral device is proximal to, or distal from the physical venue based on GPS information. In absence of RSSI information, it may not be possible to determine relative proximity. The central device may only be able to determine whether or not a peripheral device is at or nearby a given physical location associated with a merchant location (with the assumption that GPS information is accurate and available).

NFC Technology

According to another example alternative embodiment, near field communications (NFC) technology may be employed to ascertain close proximity between the customer mobile computing device and the merchant computing device, and the customer mobile computing device may be required to come physically within a close distance, such as within approximately 5 cm, of the merchant computing device, and a "tap action" may be performed on the merchant computing device in order to complete NFC actions to transfer any data between the peripheral and server devices.

With reference to FIG. 4, such actions may be employed to replace the proximity detection steps that were performed using Bluetooth. As noted above, with an NFC based implementation, the app user will have to come in close physical contact with merchant computing device to perform "tap action". Using NFC, physical proximity will be validated and the authentication token (or "identification token") may be transferred, for example from the merchant computing device to the mobile app on the customer mobile computing device, or from the customer mobile computing device to the merchant computing device.

Beyond this modification, the remaining steps may be performed in a manner that is similar to the aforementioned methods. With reference to FIG. 5A, during the confirmation and acknowledgment step, the "confirmation token" may be transmitted using NFC technology. On the merchant computing device, the user may wait for the customer mobile computing device to physically come in close contact with the merchant computing device and perform "tap action" again. Once the tap is done, a confirmation Token may be transferred from the merchant computing device to the customer mobile computing device for the customer to confirm the transaction.

Similarly, using NFC, the acknowledgment may be transferred back to the merchant computing device. Another option would be to send an "identification token" or message through the remote server using push notifications, and then have the customer perform a tap action to physically transfer the acknowledgment using NFC.

One significant difference between NFC Technology and Bluetooth (and related protocols) is that NFC cannot provide the relative proximity information that Bluetooth Low Energy is capable of providing, according to the aforementioned embodiments, since NFC involves one-to-one data transfers and requires close physical contact through tap action.

In another embodiment. NFC may be employed to detect the arrival of a customer at a merchant location based on an NFC "check in" process with a merchant NFC device. For example, a merchant NFC device may be provided at a location at, near, or within the merchant location, such that a customer arriving at the store can place his or her customer mobile computing device within range of the NFC device. The merchant NFC device would then, through a connection to a remote server such as the remote proximity detection server, or through a local connection to the merchant computing device, transmit information Indicating the presence of the customer at the merchant location. NFC communication between the customer mobile computing device and the merchant NFC device could also be employed to transmit a customer authentication token upon arrival, which could then be used to authenticate the customer as described above. Furthermore, the communication between the customer mobile computing device and the merchant NFC device could be employed to prompt the customer mobile communication device to activate its Bluetooth transceiver (or a similar local wireless transceiver functioning via a protocol capable of providing relative signal strength information) for subsequent proximity detection according to the aforementioned embodiments.

According to some example implementations, one of more of the mobile app and the proximity transaction app may be configured for multiple display modes (e.g. display screen renderings), according to the stage in the mobile commerce transaction that is currently being executed. In one example embodiment, these multiple display modes may include any or all of the following three modes: payment, redemption, and dynamic messaging. An app is not limited to any one of these single interfaces, but may invoke any combination of the three interfaces (and additional interfaces) at any time throughout the mobile experience. While the first two interfaces (payment and redemption) may involve the customer being in proximity of the merchant computing device, in the latter case of dynamic messaging, the customer need not have to be in proximity of the merchant computing device. In all three cases of the implementation of such interfaces on a customer mobile computing device, the app is running in the foreground or background of customer mobile computing device. This may be required for the Bluetooth Proximity technology to function and provide the necessary data to the merchant computing device to carry out requests. These example display modes are henceforth described in further detail.

According to one example implementation, a payment transaction may be invoked when a customer is requesting to complete a purchase or payment for goods and/or services received from merchant and wishes to provide payment using the customer mobile computing device. The merchant user may select the customer on the merchant computing device from the customer list generated by the proximity embodiments described above. The merchant user then enters the sale amount and subsequently may or may not have to enter a passcode to submit transaction to the system. At this point, the customer may be provided an option on their customer mobile computing device to enter a gratuity amount or select a pre-determined amount and the transaction maybe completed with or without the customer's consent and is confirmed by a visual and/or audible change on the merchant computing device to indicate the transaction was processed.

Once a request from the merchant computing device is received by the system (e.g. the remote transaction server), and with or without the customer's approval as the case may be, the system will carry out a charge to the customer's credit card stored with customer's profile or may withdraw funds from a connected bank account to the customer's profile or may charge against a pre-purchased credit or pass having a predefined limit associated with the customer. The preceding examples are not exhaustive and other methods may be employed to complete withdrawal of funds from customer's account. In cases where a customer approval is required, the merchant computing device may provide the merchant user with options to "resend" the transaction request. The merchant user may be provided an option to 'cancel' the transaction request and 'refund' the transaction. As noted above, the purchase may have already been remotely authorized by the mobile app, when placing an initial order or reservation, without executing the purchase at that time.

According to one example implementation, a redemption transaction may be invoked when a customer or the customer's mobile computing device presents to the merchant user, or merchant computing device, a unique identification number corresponding to specific goods and/or services from the merchant and promised to the customer upon a pre-purchased transaction carried out by the customer on the customers mobile computing device, and in general, prior to arriving at merchant's location. Upon the customer's request, the merchant user selects the customer on the merchant computing device from the customer list generated by the proximity embodiments described above. The merchant user is presented with an interface with details of the redemption request that may include details of the goods and/or service ordered, reserved, or pre-purchased by the customer, details of the identification number and any other such information as necessary. The merchant user may be prompted to either cancel the request or acknowledge completion of the request. Upon approval of the request, the merchant computing device will submit such approval to system (e.g. to the remote transaction server) and the system carries out a charge to the customer's credit card stored with customer's profile or may withdraw funds from a connected bank account to the customer's profile or may charge against a pre-purchased credit or pass having a predefined limit and associated with the customer. As noted above, these examples are not exhaustive and other methods may be employed to complete withdrawal of funds from customers account. During this process, the customer may be provided with an option on their mobile computing device to enter a gratuity amount or select a pre-determined amount and the redemption may be completed with or without the customer's consent and will be confirmed by a visual change on the merchant computing device to indicate the redemption was processed.

According to another example implementation, a dynamic messaging transaction may be invoked when a customer places a specific request through the app on the customer's mobile computing device and such request is transferred to the merchant computing device (e.g. in real-time or near real-time) and may or may not require an action from the merchant. Dynamic messaging may also be invoked by the merchant to send specific messages and/or notifications to customer in real-time or near real-time, and such messages may or may not require a response or action from customer. Dynamic messaging does not involve a transaction or the exchange of goods and/or services and does not require the customer to be in the proximity of the merchant computing device. The response from the merchant upon receiving such request on merchant computing device may be automated, and/or may come from other systems integrated with merchant computing device, such as a point-of-sale system.

In some embodiments, dynamic messaging may be performed or enabled when a given customer mobile computing device is detected to be within a pre-selected range relative to the merchant computing device, in order to enable the merchant to perform proximity-based local wireless beaconing. For example, such proximity-based messaging may be performed or enabled when the customer mobile computing device enters one or more of the proximity zones shown in FIG. 4D.

As an example where dynamic messaging may be invoked as in the case where user places a food order using their app on their mobile computing device and where customer may or may not be near a merchant location, and such food order request is sent to merchant computing device. At this point, a visual and/or audible indication on the merchant computing device will request the attention of the merchant at which point the merchant selects the customer on the customer list and invokes the dynamic messaging interface. The dynamic messaging interface may provide specific information about the customer's food order request and a prompt to either decline or accept such request. Upon acceptance, a confirmation may be sent to the customer on their mobile computing device.

Continuing the present example, after accepting customer's food order request, the merchant may be delayed and require the need to communicate an update to the customer. In such a case, the merchant may select customer from customer list on merchant computing device and invoke the dynamic messaging interface to enter a specific message thread to customer indicating the delay in completing the order. Such messages may or may not require an action from the customer.

Figure 11:
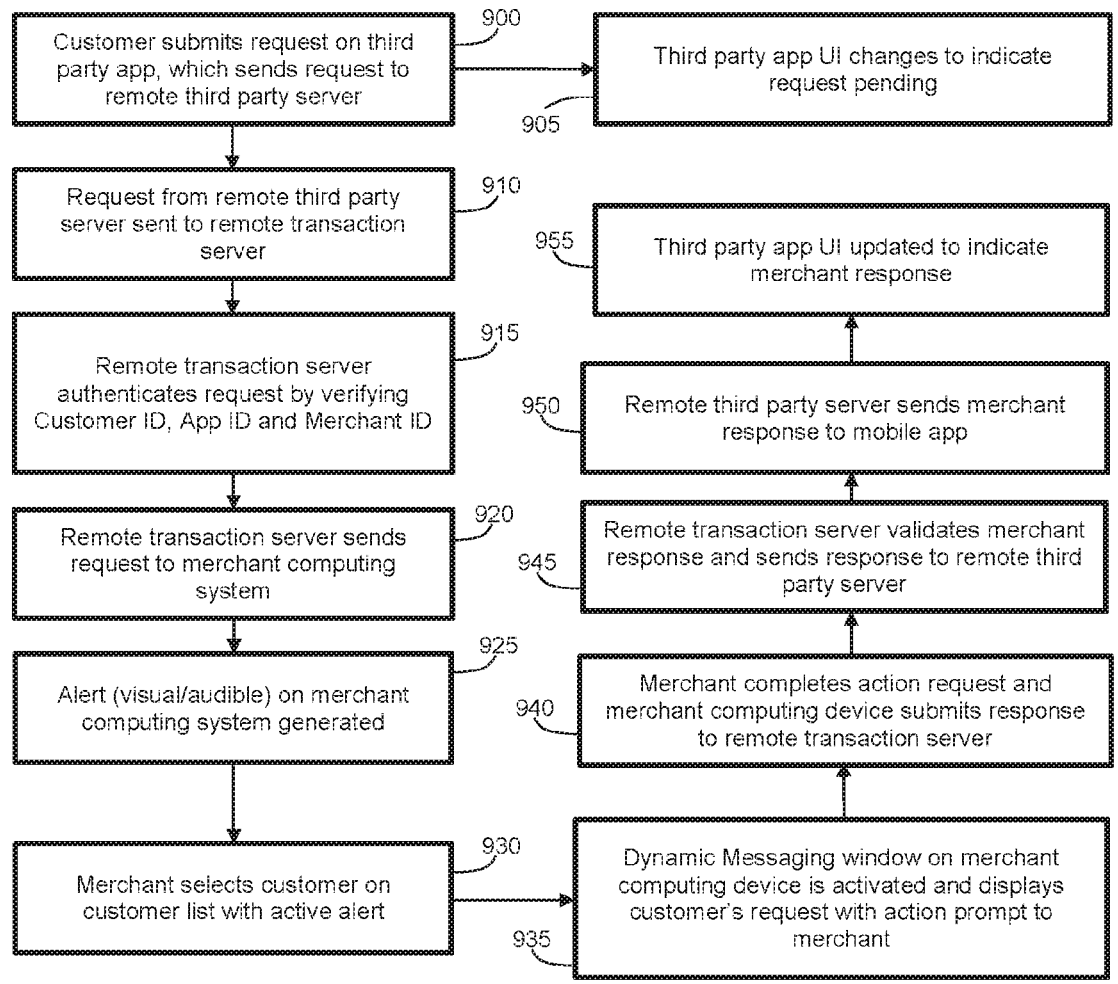
FIG. 11 is a flow chart illustrating an example implementation of a method of performing dynamic messaging between a customer and a merchant.
Figure 12A:
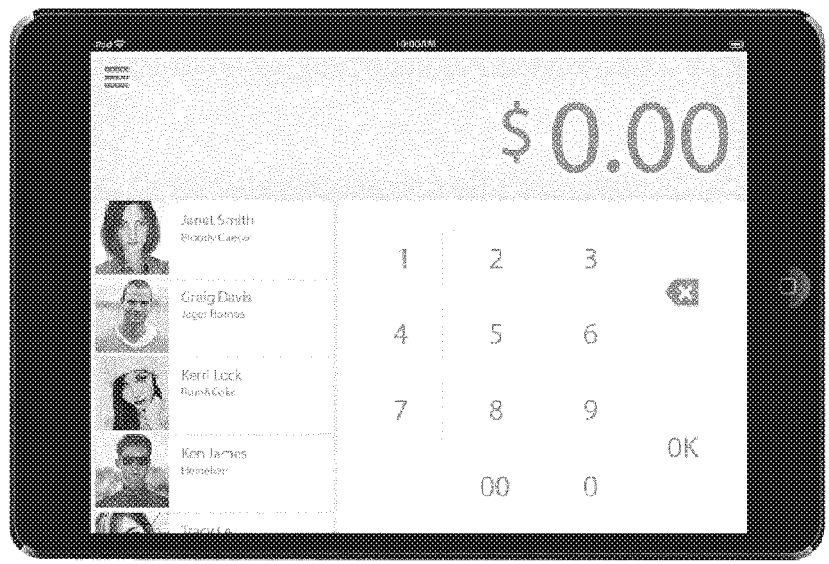
FIGS. 12A-F provide screenshots of example implementation of (A) a payment interface, (B) a redemption interface, and (C-F) a messaging interface.
Figure 12B:
Figure 12C:
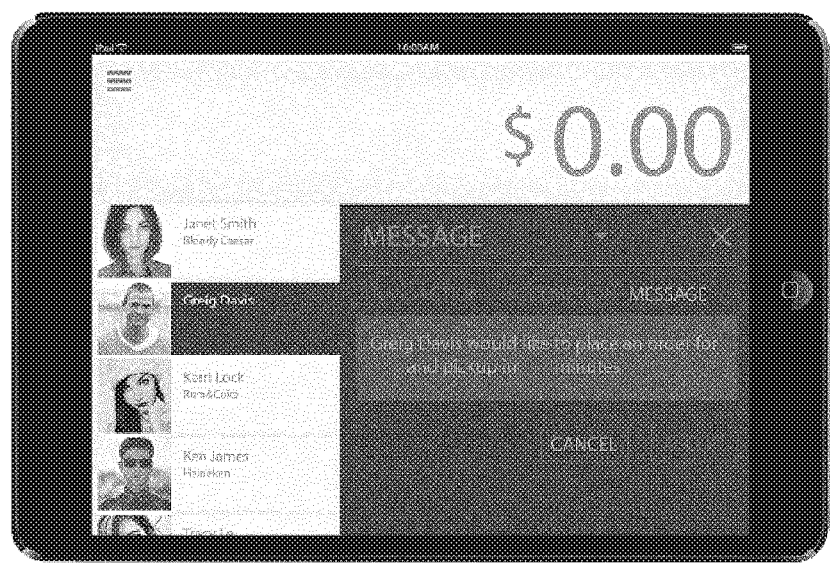
Figure 12D:
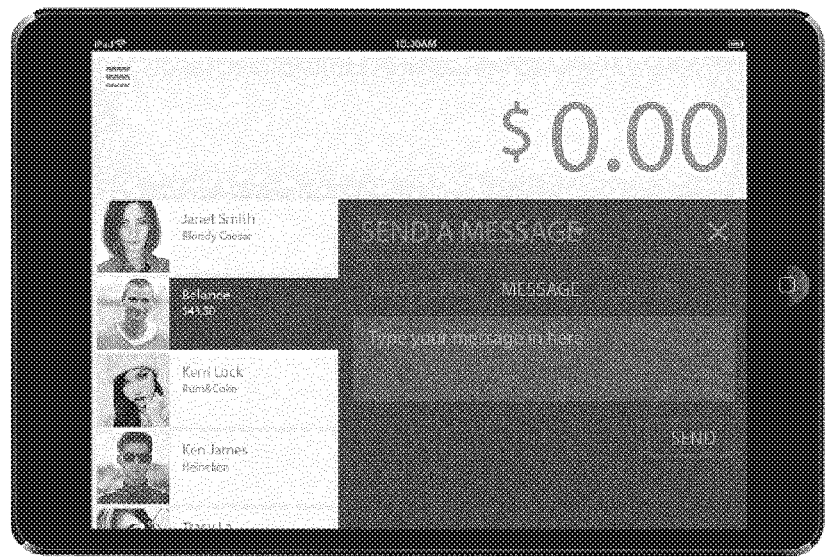
Figure 12E:
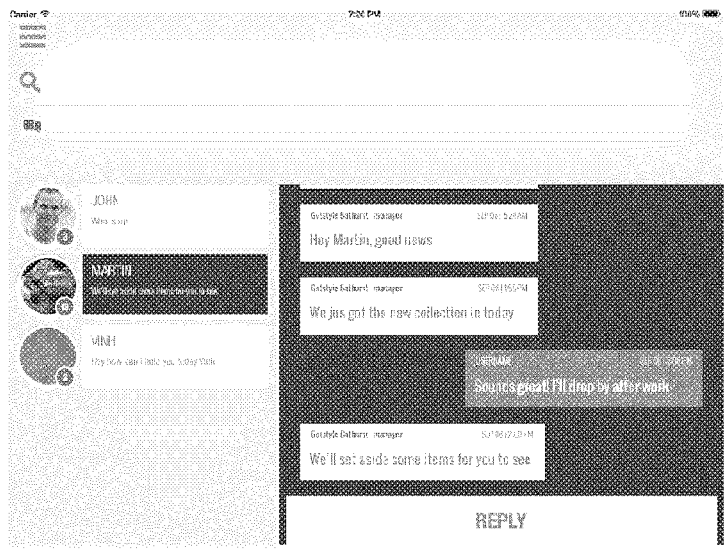
Figure 12F:
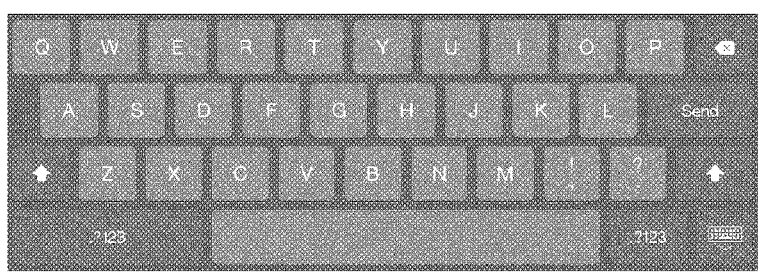

FIG. 11 provides an illustration of an example method of performing dynamic messaging. The customer submits a message, such as a request via the customer mobile app at 900, which is sent to the remote third party server, along with customer information identifying the customer (such as a customer ID) and the optionally identifying the merchant to which the message is addressed (for example, in cases where there is more than one merchant and/or more than one merchant location). The customer app UI changes to indicate that a request is pending at 905. The request and the customer information is then sent from the remote third party server to the remote transaction server at 910. The remote transaction server may then authenticate the request by verifying the customer ID, and optionally the app ID and merchant ID, at 915.

The remote transaction server then sends the request and the customer information to the merchant computing system at 920. An alert (visual/audible) may be generated on the merchant computing system in response to the request at 925. The merchant user may then select the customer on the customer list based on the presence of the active alert at 930. A dynamic messaging window may be activated on the merchant computing device (see, for example, as shown in FIGS. 12C to 12F), which displays the customer's request with an action prompt to the merchant user at 935.

The merchant user completes the action request and the merchant computing device submits a response to the remote transaction server at 940, along with the customer information identifying the customer to whom the response is addressed and optionally merchant information identifying the merchant. The remote transaction server may validate the merchant user response based on the merchant information. The remote transaction server then sends the response and the customer information to the remote third party app server at 945. The remote third party server then sends the merchant user response to the mobile app on the customer mobile computing device at 950. Finally, the mobile app user interface is updated to indicate the merchant response at 955. In one example case, an app may invoke all three interfaces: dynamic messaging to begin the mobile experience, redemption once the customer arrives at merchant location, and a payment transaction to complete additional purchases with the merchant. In most cases, either one or two of the interfaces may be sufficient to complete the mobile experience for the customer.

FIGS. 12A-D provide screenshots of example implementation of the interfaces described above, illustrating screenshots of (A) a payment interface, (B) a redemption interface, and (C-D) a messaging interface.

In another example implementation, referring again to FIGS. 1A and 1B, one or more additional mobile computing devices may be provided at or near the merchant location for use by the merchant staff. Such additional mobile computing devices (such as smart phones or tablets) interface (through a local or remote connection) with the merchant computing device and running a mobile app that displays information associated with the customers proximal to the merchant location, thereby facilitating informed interaction between merchant staff and customers. For example, one or more additional computing devices could function as a peripheral devices and communicate directly with the merchant computing device.

For example, such an additional mobile computing device could be used by store sales staff within or near a merchant location. The staff could then see who is nearby and what they have pre-ordered, and use this information (optionally as well as past purchase information) to greet/interact with the customer, and/or to try to upsell products and/or services before, during or after the customer completes his or her mobile purchase (optionally taking and submitting additional orders to the customer).

As noted above, customer mobile computing device 100*a* can take on a variety of forms. For example, in some example implementations, customer mobile computing device 100*a* may be a smartphone, tablet, laptop, or a hybrid laptop/tablet.

Figure 13A:
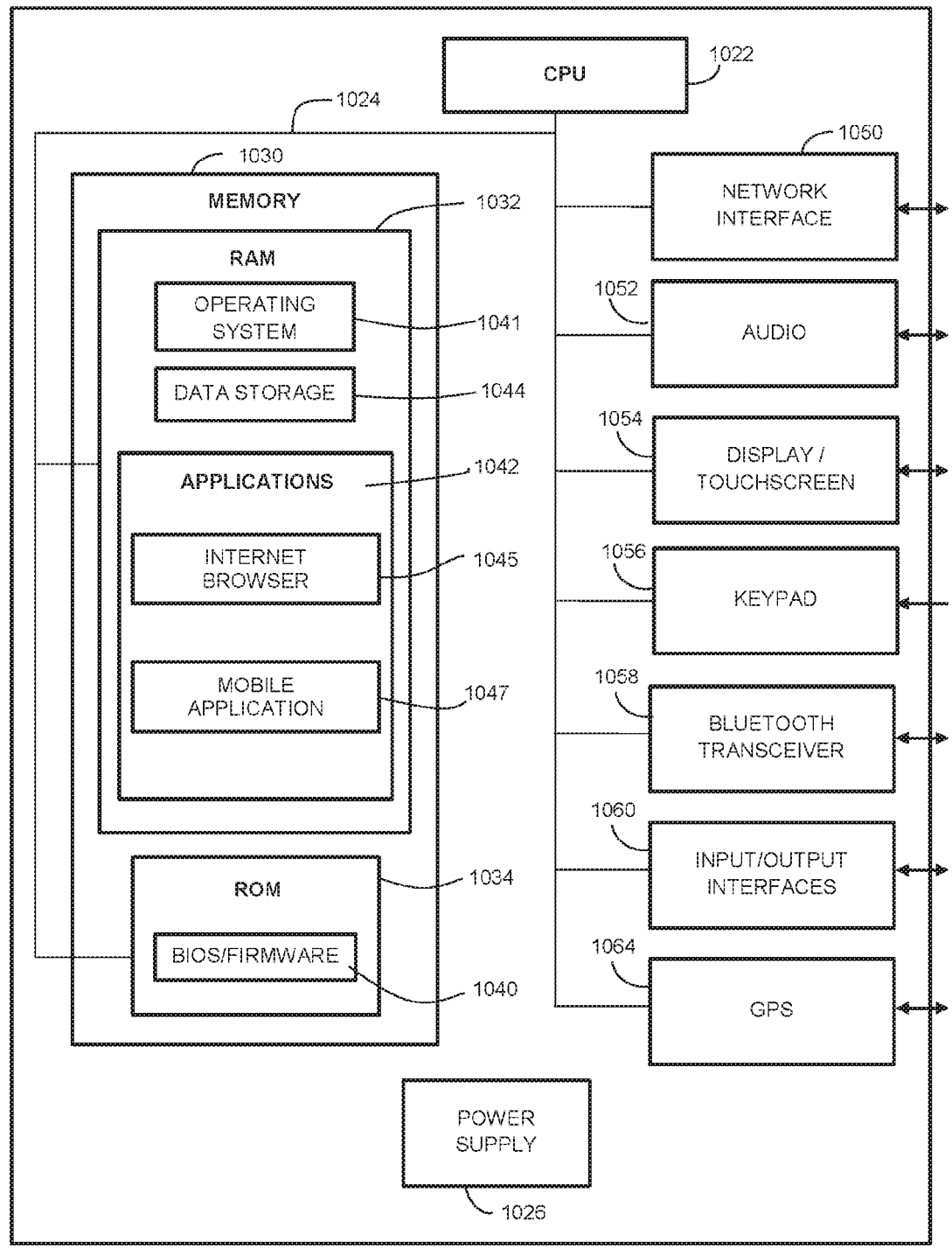
FIG. 13A is a block diagram illustrating an example implementation of a customer mobile computing device.

FIG. 13A illustrates an example embodiment of the computer hardware associated with customer mobile computing device 100*a*. Customer mobile computing device 100*a* includes a processing unit (CPU) 1022 in communication with a mass memory 1030 via a bus 1024. Customer mobile computing device 100*a* also includes a power supply 1026, one or more network interfaces 1050, an audio interface 1052, a display 1054, an optional keypad 1056, a Bluetooth transceiver 1058, one or more input/output interfaces 1060, and a global positioning systems (GPS) receiver 1064. Power supply 1026 provides power to customer mobile computing device 100*a*. A rechargeable or non-rechargeable battery may be used to provide power. The power may also be provided by an external power source, such as an AC adapter or a powered docking cradle that supplements and/or recharges a battery.

Customer mobile computing device 100*a* may optionally communicate with a base station (not shown), or directly with another computing device. Network interface 1050 includes circuitry for coupling customer mobile computing device 100*a* to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, Infrared, Wi-Fi, Zigbee, or any of a variety of other wireless communication protocols. Network interface 1050 is sometimes known as a transceiver, transceiving device, or network interface card (NIC).

Audio interface 1052 is arranged to produce and receive audio signals such as the sound of a human voice. For example, audio interface 1052 may be coupled to a speaker and microphone (not shown) to enable telecommunication with others and/or generate an audio acknowledgement for some action. Display 1054 may be a liquid crystal display (LCD), gas plasma, light emitting diode (LED), or any other type of display used with a computing device. Display 1054 may also include a touch sensitive screen arranged to receive input from an object such as a stylus or a digit from a human hand.

Customer mobile computing device 100*a* may also comprise input/output interface 1060 for communicating with external devices, such as a headset, or other input or output devices not shown in FIG. 1. Input/output interface 1060 can utilize one or more communication technologies, such as USB, infrared, Bluetooth™, Wi-Fi, Zigbee, or the like.

Optional GPS transceiver 1064 can determine the physical coordinates of customer mobile computing device 100*a* on the surface of the Earth, which typically outputs a location as latitude and longitude values. GPS transceiver 1064 can also employ other geo-positioning mechanisms, including, but not limited to, triangulation, assisted OPS (AGPS), E-OTD, CI, SAI, ETA, BSS or the like, to further determine the physical location of customer mobile computing device 100*a* on the surface of the Earth. It is also noted that other GPS systems may be employed, such as those developed by other countries including Japan India and China. It is understood that under different conditions, GPS transceiver 1064 can determine a physical location within millimeters for customer mobile computing device 100*a*; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

In one embodiment, GPS transceiver 1064 may operate with one or more other components of customer mobile computing device 100*a* to connect to a network, to provide location information to another computing device.

It should be noted, that where the user's configuration includes a GPS or other location detection device that is separate from customer mobile computing device 100*a*, then that device may also include, in one embodiment, an ability to connect to a network to provide location information to another computing device.

Mass memory 1030 includes a RAM 1032, a ROM 1034, and other storage means. Mass memory 1030 illustrates another example of computer storage media for storage of information such as computer readable instructions, data structures, program modules or other data. Mass memory 1030 stores a basic input/output system ("BIOS") or other firmware 1040 for controlling low-level operation of customer mobile computing device 100*a*. The mass memory also stores an operating system 1041 for controlling the operation of customer mobile computing device 100*a*. It will be appreciated that this component may include a general purpose operating system such as a version of UNIX, or LINUX™, or specialized client communication operating system such as iOS™, Android™, Windows Mobile™, or the Symbian® operating system. The operating system may include, or interface with a Java virtual machine module that enables control of hardware components and/or operating system operations via Java application programs.

Memory 1030 further includes one or more data storage 1044, which can be utilized by customer mobile computing device 100*a* to store, among other things, applications 1042 and/or other data. For example, data storage 1044 may also be employed to store information that describes various capabilities of customer mobile computing device 100*a*. The information may then be provided to another device based on any of a variety of events, including being sent as part of a header during a communication, sent upon request, or the like. Moreover, data storage 1044 may also be employed to store personal information including but not limited to address lists, contact lists, personal preferences, or the like. In one embodiment, data storage 1044 may be configured to store information, including, but not limited to user account information, vendor information, social network information, or the like. In one embodiment, a portion of the information may also be located remote to customer mobile computing device 100*a*.

Applications or "apps" 1042 may include computer executable instructions which, when executed by customer mobile computing device 100*a*, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth.

Applications or apps 1042 include mobile application 105*a* (shown in FIG. 1) and/or third party mobile application 106*a* shown in FIG. 1B, as described above.

Browser 1045 may be configured to receive and to send web pages, forms, web-based messages, and the like. Browser 1045 may, for example, receive and display (and/or play) graphics, text, multimedia, audio data, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Embodiments of the disclosure can be implemented via the microprocessor(s) and/or the memory. For example, the functionalities described above can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

Referring again to FIG. 1A, merchant computing device 110 may be a mobile device with a similar computer hardware layout to that shown in FIG. 13A. For example, merchant computing device 110 may be a smartphone, tablet, laptop, or a hybrid laptop/tablet. In other example implementations, merchant computing device may be another computing device such as a personal computer, or a specialty purpose retail computing device such as a point-of-sale computing device.

Figure 13B:
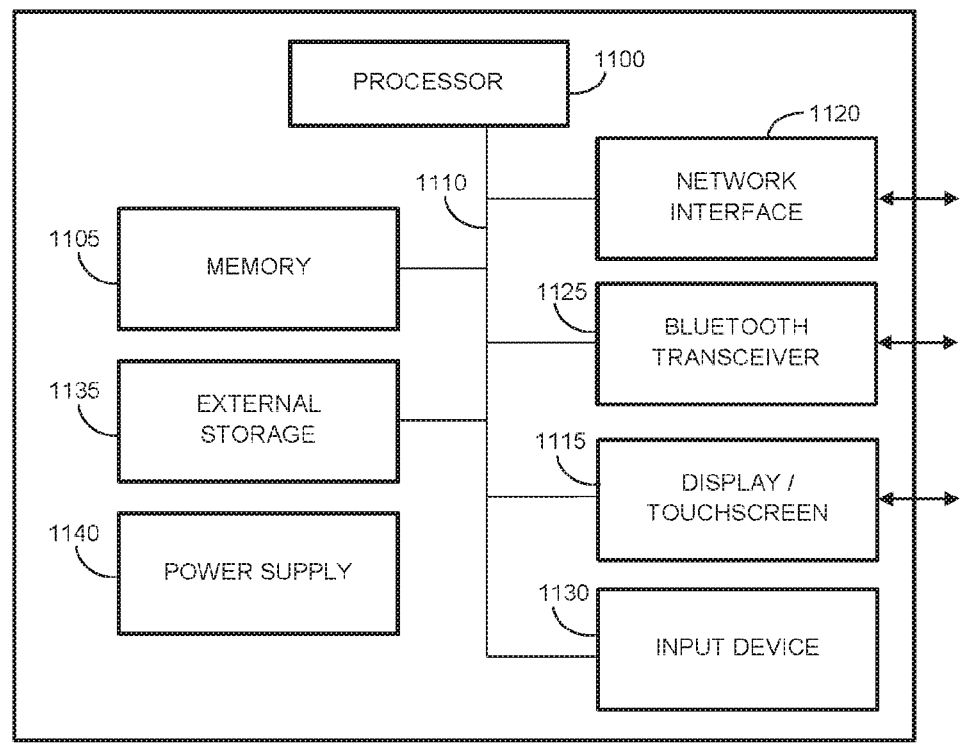
FIG. 13B is a block diagram illustrating an example implementation of a merchant computing device.

FIG. 13B illustrates one example implementation of a merchant computing device, including hardware such as a processor 1100, a memory 1105, a bus 1110, a display 1115, a network interface 1120, a local wireless communications interface such as a Bluetooth transceiver 1125, at least one input device 1130, an optional external storage device 1135, and a power supply 1140.

Figure 13C:
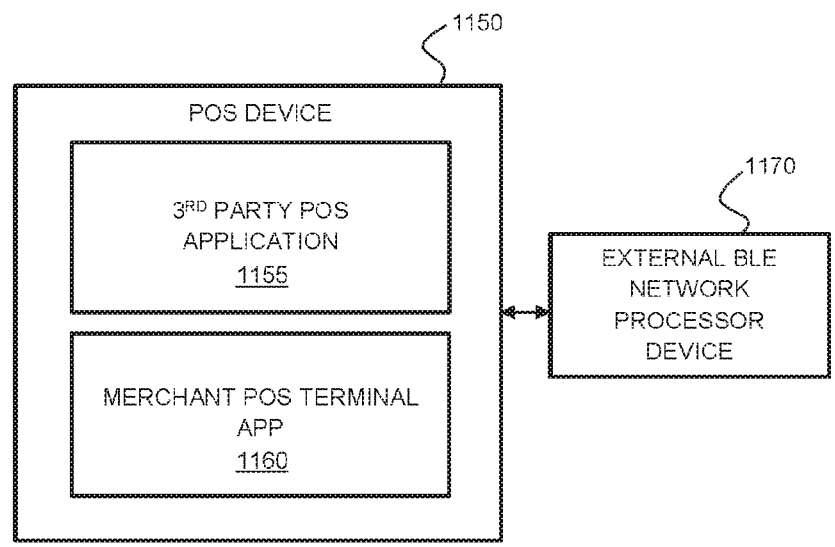
FIG. 13C is a block diagram illustrating a POS system interfaced with an external BLE network processor device, where the POS system runs a proximity transaction app that communicates with the external BLE device.

Although the merchant computing device may be implemented on a computing device such as a tablet, laptop, or other computing device (fixed or mobile), it is to be understood that in other example embodiments, the merchant computing device may alternatively be implemented using a conventional point-of-sale (POS) device, provided that the POS device includes an operating system that enables the execution of a custom application (such as, for example, Windows CE). FIG. 13C illustrates an alternative embodiment of a merchant computing device, where a conventional POS computing device 1150 is interfaced with an external BLE network processor device 1170 to provide Bluetooth functionality. POS device 1150 is programmed to execute a proximity transaction app that communicates with external BLE network processor device. Accordingly, the POS device may provide the computing environment on which to run, or within which to embed, the proximity transaction app. The running of such an app may be achieved as a third-party client, for example, running in a new and dedicated window of the POS user interface. It will be understood that external BLE network processor device 1170 may be implemented according to many different hardware platforms, such as via a card-based interface, or via a device that connects through a port such as a serial port or USB port. One example of a suitable device is a USB device that includes the Texas Instrument CC2540F256 (Bluetooth Low Energy Chip). Such a processor chip can be run as a network processor, providing the needed BLE functionality to the POS device (e.g. via a HCl command interface).

Figure 13D:
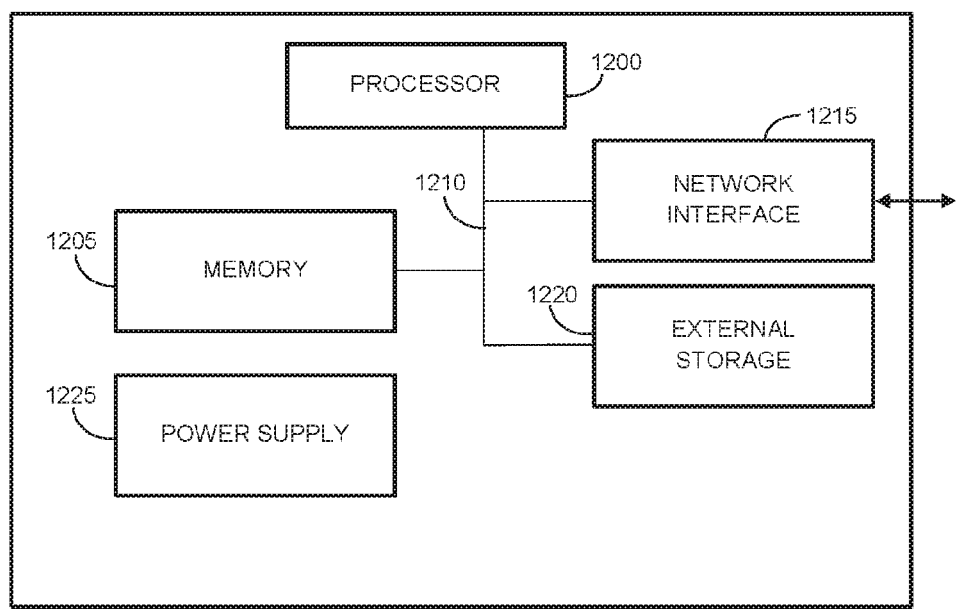
FIG. 13D is a block diagram illustrating an example implementation of a remote server.

FIG. 13D illustrates one example implementation of the computer hardware associated with a remote server (such as the remote third party server or the remote transaction server), including a processor 1200, a memory 1205, a bus 1210, a network interface 1215, an optional external storage device (such as a database) 1215, and a power supply 1225.

While some embodiments can be implemented in fully functioning computers and computer systems, various embodiments are capable of being distributed as a computing product in a variety of forms and are capable of being applied regardless of the particular type of machine or computer readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

Although the preceding example implementations have been disclosed as pertaining to interactions and transactions between a customer and a merchant, it will be understood that these are illustrative examples, and that in other embodiments, the interactions and transactions may take place between other parties. For example, the term "customers" may be replaced with the term "first users", and the term "merchants" may be replaced with the phrase "second users". Accordingly, the "customer mobile computing device", as described above, may be referred to as a "first computing devices" that are mobile computing devices pertaining to one or more first users, and the merchant device, or merchant devices, may pertain to a "second user device", or "second user computing device", respectively, which may be mobile computing devices. For example, proximity-based interactions and transactions take place when one or more first mobile computing devices, associated with one or more first users, arrive at or near a location associated with a second user having a second computing device.

Furthermore, while many of the example implementations described above relate to transactions involving payment, it will be understood that the methods and systems described above may be adapted to address interactions between first users and second users, in which a transaction or interaction need not involve payment. For example, the first user and the second user need have a customer-merchant relationship.

An example of an implementation involving interactions between first users and one or more second users that may not necessarily involve a customer-merchant relationship is interactions and transactions between patients and physicians or other health care entities, such as interactions between patients booking services (such as a doctor's appointment). For example, various embodiments of the disclosure, as described above, could be employed to facilitate the convenient mobile interaction between patients arriving at a doctor's office for pre-booked appointments. In such an embodiment, the use of a local wireless network could be employed for waiting room management, as a heath care facility user, operating the second user device, could employ the device to view and manage the patients arriving and waiting for their pre-booked appointments. Furthermore, the messaging embodiments described above could be employed to allow the patients to check-in via a mobile interface, and provide information, such as a reason for the visit, that may be employed to triage and/or prioritize the patients.

Other non-limiting examples of implementations that do not necessarily involve a customer-merchant relationship include: drivers arriving at a government service center to renew a license, users arriving at a library to check out books that had been electronically reserved, conference attendees arriving at a conference check-in desk and receiving conference materials, guests arriving at a party and receiving an item, such as a welcome gift, or receiving information, such as a table assignment, or receiving the granting of admission to a venue, as per a pre-configured guest list.

In other implementations, the relationship between the first user(s) and the second user may be a customer-merchant type relationship, but the second user need not be a merchant in the conventional sense that involves a brick-and-mortar merchant location, or and may not even have a business name. For example, the customer may be a first user having purchased an item or service from a second user on a website or other internet portal, such as eBay, Kijiji, or the like. In such a case, the location associated with the "merchant", i.e. the location of the second user, may be the home of the second user, or an agreed-upon location for conducting the transaction. In such an example, a "merchant" may conveniently employ the methods described herein to arrange for in-person transactions with multiple customers, and to authenticate the customers arriving at the agreed location based on proximity interactions. In another example, the first user may be a parent, and the second user may be a babysitter (a type of merchant), whereby the parent has pre-booked or pre-ordered a babysitting service (for example, through a third-party website through which multiple babysitters offer their services), and wherein the methods described herein are employed to authenticate and complete the transaction when the babysitter arrives at the home of the parent.

As noted above, the mobile interactions and transactions pertaining to the present embodiments need not relate to a product, and may, for example, generally relate to a product, an item, a good, a service, a procedure, and any combination thereof. Examples of mixed product/service interactions include interactions between a customer and a hotel, where the hotel offers products (a room for rental for a time duration) and services (cleaning of a room, baggage service, etc.).

The following examples are presented to enable those skilled in the art to understand and to practice embodiments of the present disclosure. They should not be considered as a limitation on the scope of the disclosure, but merely as being illustrative and representative thereof.

EXAMPLES

The following example describes an example implementation of the systems and methods generically illustrated in FIGS. 9 and 10, in the example case of a Bluetooth Low Energy Implementation using an iPhone/iPad configuration.

Example 1: Initiating a Bluetooth Low Energy Connection and Services

Once the app is launched on peripheral device (in this example case, an iPhone), the first action it will perform is to check for Bluetooth being ON and available to the mobile app on the peripheral device. When creating the mobile app, the IOS OS function defined by CoreBluetooth API may be employed to define Services and characteristics. Accordingly, once the app is initiated by the customer, the app waits for the call-back to the function: PeripheralManagerupdateState.

If the State changes to CBPeriperipheralManagerState-PoweredON, then the mobile app detects that Bluetooth is ON and available to the mobile app. If this is not the case, the app prompts the customer to turn Bluetooth ON. Once the Bluetooth is ON and available to mobile app, the Read and Write Services are created. Two Services are created, as defined by specific UUID:
READ_SERVICE
WRITE_SERVICE This allows communication both ways using Bluetooth. Inside the Services, there are specific characteristics for each Service that were created. Read Characteristic allows the Bluetooth Low Energy central device to be notified when a value is updated on the characteristic. Write characteristic allows the Bluetooth Low Energy central device to write to that device, once connected and subscribed to. Here are example of these Service and Characteristic UUIDs:
define READ_SERVICE_UUID @"4B32EB45-1B2E-4691-9709-9B233FC6B254"
define READ_CHARACTERISTIC_UUID @"861D25D2-47A6-40E4-9BFE-648C6CCDBF4B"
define WRITE_SERVICE_UUID @"B2E15439-52C8-25BB-ACC7-4337C8114AA3"
define WRITE_CHARACTERISTIC_UUID @"7F5B253B-D722-4844-A845-C32B4212ED5E"

The central device discovers the peripheral device and goes ahead and checks if there is a device-UUID attached to that peripheral. If there is, then it checks if it is in the Ignore List or not. If it is not in the Ignore list, it goes ahead and initiates the Bluetooth connection. If the device has not been connected previously, device-UUID is shown as Null. When device-UUID is null, or If the device UUID is not present in the merchant computing device, it means the merchant computing device has not seen the device before OR the device-UUID got updated by iOS. This is where the Bluetooth connection is initiated by the central device.

Once the connection is initiated, it scans for all the services advertised by the device. The central device then checks for READ Service and then looks for the characteristics available in the service. If the central device finds the READ characteristic, Bluetooth Low Energy central device subscribes to it. When the central device subscribe to it, its notify value is set to YES, so that it starts notifying the Bluetooth Low Energy central device if any values changes inside the characteristic. Bluetooth Low Energy only allows 20 bytes per data-exchange, hence notifications come in data packets.

Example 2: Bluetooth Device UUIDs for Several Devices

| | |
|---|---|
| <CFUUID> AD074D572D50 | C9968C6B-8464-9670-8CC9- |
| <CFUUID> D13612ED704E | 83A8294E-6213-AA41-1181- |
| <CFUUID> 7B77F5B20E36 | BDE4BFOB-A8A9-4732-BBAA- |
| <CFUUID> 575E9A86BE79 | 0938A4C7-20BA-4326-A818- |
| <CFUUID> 7364A1BD4138 | 7CFAC07D-3070-4A02-ACC6- |
| <CFUUID> 99108A368A46 | A504ADE9-85D5-447C-BO5F- |

Example 3: Bluetooth Service UUIDs for Several Devices Running the App define READ_SERVICE_UUID @"4B63EB34-1B2E-4691-9709-9B243FC6B254"

define WRITE_SERVICE_UUID @"B2E18839-89C8-46BB-ACC7-4337C8114AA3"

Example 4: Bluetooth Service UUID Characteristics for Devices on which a Purchase has been Made—i.e. Having Mobile Product IDs defineREAD_CHARACTERISTIC_UUID @"861D08D2-47A6-40E4-9BFE-648C6CCDBF4B"
define WRITE_CHARACTERISTIC_UUID @"7F5B272B-D722-4844-A845-C55B4216ED5E"

Example 5: Lists and how they are Updated after Two Different Cycles

In this scenario, following device-UUIDs are tagged based on the list to which they belong:
6405AFBC-4282-495A-BCC8-32116268409F—IgnoreList
EEF1918E-A989-49DC-BBB3-E60BD4922C82—ApList
F21155B3-99C9-4190-8A8B-5C3F7B4F27A5—ApList
4BBCD749-800D-4037-8A65-97786E27F93F—AppList
5036F42B-C501-4B26-A9F5-16D4FF7E852D—MobileProductList A new peripheral device comes within the Bluetooth Network with a new device-UUID (FA342C87-D0C5-46CC-BEAA-B69E2D7597E8). This device has the app installed and running, but has not purchased any mobile product, so it will go to the App List. This will be added to list in the table and tagged properly. The table will be updated as follows:
6405AFBC-4282-495A-BCC8-32116268409F—IgnoreList
EEF1918E-A989-49DC-BBB3-E60BD4922C82—ApList
F21155B3-99C9-4190-8A8B-5C3F7B4F27A5—ApList
4BBCD749-800D-4037-8A65-977B6E27F93F—ApList
5036F42B-C501-4B26-A9F5-16D4FF7E852D—MobileProductList
FA342C87-D0C5-46CC-BEAA-B69E2D7597E8—ApList Next, another peripheral device with a new device-UUID (1D6EA84D-FCE8-485E-9DB2-B5CDD7EF5CD5) comes into the Bluetooth network but it does not have the App installed, so it will go to the Ignore List. The table will be updated as follows:
6405AFBC-4282-495A-BCC8-32116268409F—IgnoreList
EEF1918E-A989-49DC-BBB3-E60BD4922C82—ApList
F21155B3-99C9-4190-8A8B-5C3F7B4F27A5—ApList
4BBCD749-800D-4037-8A65-977B6E27F93F—ApList
5036F42B-C501-4B26-A9F5-16D4FF7E852D—MobileProductList
FA342C87-D0C5-46CC-BEAA-B69E2D7597E8—ApList
1D6EA84D-FCE8-485E-9DB2-B5CDD7EF5CD5—IgnoreList Example 6: Obtaining a Bluetooth Service UUID (and Mobile Product ID)

In the present example, Bluetooth Low Energy peripheral devices broadcast their device-UUID, which can be read by any other Bluetooth Low Energy central device. Compared to older Bluetooth technology, in the Bluetooth Low Energy implementation there is no need to pair two devices to establish a connection. A Bluetooth Low Energy central device can initiate a connection and then determine which Services and Characteristics are available on that device. If there is a pre-defined Service and Characteristic that both the central device and peripheral devices understand, then a connection is established.

According to the present example, once the Bluetooth Low Energy central device detects the Bluetooth Low Energy peripheral device, it establishes a connection. At this time, as the connection is established, the Bluetooth Low Energy central device finds the service and the characteristics associated with it. This information is transferred over to the Bluetooth Low Energy central device during this connection and thereby providing the Mobile Product ID on the Bluetooth Low Energy central device side. After this, connection is dropped and Bluetooth Low Energy central device moves on to interrogate the next device.

On the central device side, a list/dictionary of all the customers is maintained. Once a connection is established with the peripheral device, using Bluetooth, data is transferred over to the central device. On the peripheral device side, it may send the Mobile Product ID and a success message. On Server device side, once the data is encoded and it receives the Mobile Product ID, if it finds the match in the local database, then it attaches the device-UUID to the Mobile Product id. From this point, the Mobile Product ID and device-UUID are linked. They are linked unless the device-UUID changes. If a new device-UUID is detected then Mobile-Product ID provides the reference to establish that it was the same device that was previously discovered.

Here an example Log from central device going through this process:

```
2013-08-29 15:27:15,803 Terminal[721:907] TRY TO CONNECT
2013-08-29 15:27:15.807 Terminal[721:907] CONNECTED
<CBConcrete,Peripheral: 0x1f8ccee0 UUID = <CFUUID 0x1f8dfab0> 83A8294E-
6213-AA41-1181-D13612ED704E, Name = "iPhone", IsConnected = YES>
2013-08-29 15:27:15.818 Terminal[721:907] SERVICES
<CBConcretePeripheral: 0x1f8ccee0 UUID = <CFUUID 0x1f8dfab0> 83A8294E-
6213-AA41-1181-D13612ED704E, Name = "iPhone", IsConnected = YES>
2013-08-29 15:27:15.874 Terminal[721:907] NOTIFICATION BEGAN ON
<CBConcretePeripheral: 0x1f8ccee0 UUID = <CFUUID 0x1f8dab0> 83A8294E-6213-AA41-1181-D13612ED704E, Name = "iPhone", IsConnected = YES>
2013-08-29 15:27:15.905 Terminal[721:907] CHECKIN {
  lucovaID = 9bd5db88t7e9730f6d193590bc4cc74
  success = 1;
  type = checkin;
}
2013-08-29 15:27:15.906 Terminal[721:907] ADDING <CFUUID 0x1f8dfab0> 83A8294E-6213-AA41-1181-D13612ED704E
2013-08-2915:27:15.965 Terminal[721:907] DISCONNECTED
<CBConcretePeripheral: 0x1f8ccee0 UUID = <CFUUID 0x1f8dfab0> 83A8294E-6213-AA41-1181-D13612ED704E, Name = "iPhone", IsConnected = NO>
```

Example 7: Tracking a Device-UUID that Randomly Changes

In this example, it is shown how a device-UUID changes while the system still keeps track of the peripheral device and ensure it is same as before. Below is an example list of device-UUIDs that are being maintained and tagged as Ignore, App, and Mobile Product. In this list, device-UUID with Mobile Product also has the Mobile Product ID attached to it:

6405AFBC-4282-495A-BCC8-32116268409F—Ignore-List
    EEF1918E-A989-49DC-BBB3-E60BD4922C82—ApPUst
    F21155B3-99C9-4190-8A8B-5C3F7B4F27A5—ApList
    4BBCD749-800D-4037-8A65-977B6E27F93F—ApList
    5036F42B-C501-4B26-A9F5-16D4FF7E852D—(lucovaID=9bd5db88fb7e9730f6d193590bc4cc74)
    FA342C87-D0C5-46CC-BEAA-B69E2D7597E8—ApList After some time has elapsed, the device-UUID changes for the peripheral device, and the central device detects a new device-UUID:

164793FA-F6A2-4495-8FD7-82F8E5619F5F

When the central device establishes connection and reads Services and characteristics, it discovers the same Mobile Product ID:

lucovaID=9bd5db88fb7e9730f6d193590bc4cc74)

Hence, it will update the list for this Mobile Product ID with the device-UUID. The updated table will take the following form:

6405AFBC-4282-495A-BCC8-32116268409F—Ignore-list
    EEF1918E-A989-49DC-BBB3-E60BD4922C82—ApList
    F21155B3-99C9-4190-8A8B-5C3F7B4F27A5—ApList
    4BBCD749-800D-4037-8A65-977B6E27F93F—ApList
    164793FA-F6A2-4495-8FD7-82F8E5619F5F—(lucovaID+9bd5db88fb7e9730f6d193590bc4cc74)
    FA342C87-D0C5-46CC-BEAA-B69E2D7597E8—ApList Accordingly, the device with the app and the Mobile Product ID is successfully tracked in the list, even after dynamic random modification of the device-UUID.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A system for proximity-based prioritization according to relative signal strength of detected wireless signals, the system comprising:
a remote server; and
a merchant computing device connected to said remote server over a remote network;
said merchant computing device being configured to broadcast local wireless signals comprising device identification information, such that a plurality of customer mobile computing devices residing within range of the local wireless signals can detect the local wireless signals and obtain the device identification information associated with said merchant computing device without establishing respective connections with said merchant computing device;
said remote server being configured to establish a respective connection with each customer mobile computing device and to receive, from each customer mobile computing device, the device identification information and a respective relative signal strength associated with the local wireless signals;
said merchant computing device being further configured to perform at least the following operations in the absence of requiring connections with said plurality of customer mobile computing devices:
receiving, from said remote server, customer identification information and customer proximity information respectively associated with each customer mobile computing device, the customer proximity information pertaining to the proximity of each customer mobile computing device relative to the merchant computing device and being generated based on the respective relative signal strength measured by each customer mobile computing device, the customer identification information and customer proximity information being pushed from said remote server in the absence of a request by said merchant computing device for the customer identification information and customer proximity information; and
employing the customer identification information and the customer proximity information to display a proximity-based customer list;
thereby facilitating passive determination, by the merchant computing device, of customer identification information and customer proximity information associated with the plurality of customer mobile computing devices.

2. The system according to claim 1 wherein said remote server is configured such that the customer proximity information that is associated with each customer mobile computing device and is transmitted to said merchant computing device comprises the respective relative signal strength associated with each customer mobile computing device, and wherein said merchant computing device is configured to process the respective relative signal strengths detected by the plurality of customer mobile computing devices to determine the proximity-based customer list.

3. The system according to claim 1 wherein the customer identification information and the customer proximity information is employed by said remote server to generate the proximity-based customer list, and wherein the proximity-based customer list is transmitted from said remote server to said merchant computing device in the absence of transmitting the respective relative signal strengths detected by the plurality of customer mobile computing devices.

4. The system according to claim 1 wherein at least one of said remote server and said merchant computing device is configured to process the respective relative signal strengths detected by the plurality of customer mobile computing devices to associate each customer mobile computing device with one of a plurality of proximity zones surrounding said merchant computing device.

5. The system according to claim 4 wherein at least one of said remote server and said merchant computing device is configured such that the plurality of customer mobile computing devices comprise a first proximity zone that is closest to said merchant computing device, a second proximity zone, and a third proximity zone, wherein the second proximity zone resides between the first proximity zone and the third proximity zone, and wherein mobile transactions are restricted for customer mobile computing devices residing within the second proximity zone, and wherein mobile transactions are disabled for customer mobile computing devices residing in the third proximity zone.

6. The system according to claim 4 wherein said merchant computing device is configured to display information associated with each customer mobile computing device in a manner that is specific to its associated proximity zone.

7. The system according to claim 4 wherein at least one of said remote server and said merchant computing device is configured such that a pending transaction associated with a given customer mobile computing device is controlled according to the proximity zone in which the given customer mobile computing device is associated.

8. The system according to claim 7 wherein at least one of said remote server and said merchant computing device is configured such that the pending transaction associated with the given customer mobile computing device is restricted when the proximity zone associated with the given customer mobile computing device resides beyond a proximity zone that is closest to said merchant computing device.

9. The system according to claim 8 wherein at least one of said remote server and said merchant computing device is configured such that the execution of the pending transaction is disabled when the pending transaction exceeds a threshold value.

10. The system according to claim 8 wherein at least one of said remote server and said merchant computing device is configured such that the execution of the pending transaction is disabled when the proximity zone associated with the given customer mobile computing device is furthest from said merchant computing device.

11. The system according to claim 7 wherein said remote server is further configured to transmit a promotional message to the given customer mobile computing device when the proximity zone associated with the given customer mobile computing device resides beyond a proximity zone that is closest to said merchant computing device.

12. The system according to claim 7 wherein said remote server is further configured to transmit a promotional message to the given customer mobile computing device when the proximity zone associated with the given customer mobile computing device is furthest from said merchant computing device.

13. The system according to claim 1 wherein said merchant computing device is configured to display a visual indicator for each customer having an associated relative signal strength measure that exceeds a pre-selected threshold.

14. The system according to claim 1 wherein said remote server and said merchant computing device are configured such that the device identification information is generated by said remote server and transmitted from said remote server to said merchant computing device prior to broadcasting of the device identification information by said merchant computing device.

15. The system according to claim 14 wherein said merchant computing device is further configured such that the local wireless signals further comprise service identification information, such that the plurality of customer mobile computing devices residing within range of the local wireless signals can obtain, via detection of the local wireless signals, the service identification information without establishing respective connections with said merchant computing device.

16. The system according to claim 15 further comprising said plurality of customer mobile computing devices, wherein each customer mobile computing device is configured to scan the local wireless signals wireless signals for the service identification information, and to transmit, to said remote server, the device identification information and the relative signal strength measurement only when the detected local wireless signals include both the device identification information and the service identification information.

17. The system according to claim 1 wherein said remote server is further configured to establish a respective connection with one or more additional customer mobile computing devices and to receive, from each additional customer mobile computing device, the device identification information in the absence of receiving a respective relative signal strength associated with the local wireless signals; and
wherein said merchant computing device is further configured to perform at least the following operations in the absence of requiring connections with said plurality of customer mobile computing devices:
receiving, from said remote server, additional customer identification information respectively associated with each additional customer mobile computing device; and
displaying an additional list identifying each additional customer respectively associated with each additional customer mobile computing device.

18. The system according to claim 17 wherein said remote server is further configured to transmit connection time information associating, with each additional customer mobile computing device, an initial time of connection between the additional customer mobile computing device and said remote server, and wherein said merchant computing device is further configured to prioritize the additional list according to the connection time information.

19. The system according to claim 1 wherein said merchant computing device is configured such that the local wireless signals are associated with a Bluetooth communication protocol.

20. The system according to claim 1 wherein said merchant computing device is configured such that the local wireless signals are associated with a Bluetooth low energy communication protocol.

21. A system for proximity-based prioritization according to relative signal strength of detected wireless signals, the system comprising:
a merchant computing device, said merchant computing device being connectable to a remote server over a remote network;
said merchant computing device being configured to broadcast local wireless signals comprising device identification information, such that a plurality of customer mobile computing devices residing within range of the local wireless signals can detect the local wireless signals and obtain the device identification information associated with said merchant computing device without establishing respective connections with said merchant computing device;
said merchant computing device being further configured to perform at least the following operations in the absence of requiring connections with said plurality of customer mobile computing devices:
receiving, from said remote server, customer identification information and customer proximity information respectively associated with each customer mobile computing device, the customer proximity information pertaining to the proximity of each customer mobile computing device relative to the merchant computing device and being generated based on the respective relative signal strength measured by each customer mobile computing device via the detection of the local wireless signals, the customer identification information and customer proximity information being pushed from the remote server in the absence of a request by said merchant computing device for the customer identification information and customer proximity information; and employing the customer identification information and the customer proximity information to display a proximity-based customer list;

thereby facilitating passive determination, by the merchant computing device, of customer identification information and customer proximity information associated with the plurality of customer mobile computing devices.

\* \* \* \* \*